United States Patent
Cohen

(10) Patent No.: US 10,455,780 B2
(45) Date of Patent: Oct. 29, 2019

(54) IN LINE BUTTON DRIP EMITTER

(71) Applicant: Amirim Products Development & Patents Ltd., Yuvalim (IL)

(72) Inventor: Amir Cohen, Yuvalim (IL)

(73) Assignee: Amirim Products Development & Patents Ltd., Yuvalim (IL)

( * ) Notice: Subject to any disclaimer, the term of this patent is extended or adjusted under 35 U.S.C. 154(b) by 0 days.

(21) Appl. No.: 15/289,252

(22) Filed: Oct. 10, 2016

(65) Prior Publication Data

US 2017/0020086 A1  Jan. 26, 2017

Related U.S. Application Data

(63) Continuation of application No. 13/937,294, filed on Jul. 9, 2013, now Pat. No. 9,462,760.

(51) Int. Cl.
*A01G 25/02* (2006.01)

(52) U.S. Cl.
CPC .......... *A01G 25/023* (2013.01); *A01G 25/02* (2013.01); *A01G 25/026* (2013.01); *Y02A 40/237* (2018.01)

(58) Field of Classification Search
CPC ......... A01G 25/02; A01G 25/023; B05B 1/14
USPC .................................................. 239/542, 547
See application file for complete search history.

(56) References Cited

U.S. PATENT DOCUMENTS

| | | | |
|---|---|---|---|
| 3,667,685 A | 6/1972 | Rinkewich | |
| 4,209,133 A | 6/1980 | Mehoudar | |
| 4,210,287 A | 7/1980 | Mehoudar | |
| 4,281,798 A | 8/1981 | Lemelstrich | |
| 4,366,926 A | 1/1983 | Mehoudar | |
| 4,369,923 A | 1/1983 | Bron | |
| 4,533,083 A | 8/1985 | Tucker | |
| 4,589,595 A | 5/1986 | Havens | |
| 4,850,531 A | 7/1989 | Littleton | |
| 5,137,216 A | 8/1992 | Hanish | |
| 5,183,208 A | 2/1993 | Cohen | |
| 5,279,462 A | 1/1994 | Mehoudar | |
| 5,294,058 A | 3/1994 | Einav | |
| 5,295,506 A | 3/1994 | Smith | |
| 5,443,212 A | 8/1995 | Dinur | |

(Continued)

FOREIGN PATENT DOCUMENTS

| | | |
|---|---|---|
| CN | 102933071 | 2/2013 |
| WO | WO 92/05689 | 4/1992 |

(Continued)

OTHER PUBLICATIONS

Applicant-Initiated Interview Summary dated Jun. 23, 2017 From the U.S. Appl. No. 14/596,580. (3 pages).

(Continued)

*Primary Examiner* — Arthur O. Hall
*Assistant Examiner* — Tuongminh N Pham

(57) ABSTRACT

A drip irrigation emitter may be provided with a coupler for bonding to an inner surface of a conduit. The emitter may include for example a button flow restrictor. The coupler may optionally provide an outlet zone on the conduit surface that is large enough for automated perforation. Bonding the emitter to the surface of the conduit may have a minimal effect on the dimensions and/or properties of the conduit. A button drip irrigation emitter may optionally include a two part labyrinth. The labyrinth may for example be confined between a cylindrical surface and a cover and/or wind between intermeshing baffles on the cover and/or the surface.

23 Claims, 15 Drawing Sheets

(56) References Cited

U.S. PATENT DOCUMENTS

| | | | |
|---|---|---|---|
| 5,636,797 | A | 6/1997 | Cohen |
| 5,820,028 | A | 10/1998 | Dinur |
| 6,027,048 | A | 2/2000 | Mehoudar |
| 6,206,305 | B1 | 3/2001 | Mehoudar |
| 6,250,571 | B1 | 6/2001 | Cohen |
| 6,302,338 | B1 | 10/2001 | Cohen |
| 6,481,645 | B1 | 11/2002 | Taylor-McCune et al. |
| 6,568,607 | B2 | 5/2003 | Boswell et al. |
| 6,698,629 | B2 | 3/2004 | Taylor-McCune |
| 7,270,280 | B2 | 9/2007 | Belford |
| 7,681,810 | B2 | 3/2010 | Keren |
| 8,141,589 | B2 | 3/2012 | Socolsky |
| 8,317,111 | B2 | 11/2012 | Cohen |
| 8,511,586 | B2 | 8/2013 | Einav et al. |
| 9,022,059 | B2 | 5/2015 | Cohen |
| 9,307,705 | B2 | 4/2016 | Akritanakis |
| 9,462,760 | B2 | 10/2016 | Cohen |
| 2005/0284966 | A1 | 12/2005 | DeFrank |
| 2009/0212135 | A1 | 8/2009 | Keren |
| 2010/0237170 | A1 | 9/2010 | Rosenberg et al. |
| 2012/0012682 | A1 | 1/2012 | Einav |
| 2012/0097254 | A1 | 4/2012 | Cohen |
| 2012/0267454 | A1 | 10/2012 | Einav et al. |
| 2013/0248616 | A1 | 9/2013 | Ensworth et al. |
| 2014/0246520 | A1 | 9/2014 | Einav |
| 2015/0012682 | A1 | 1/2015 | Yang et al. |
| 2015/0014446 | A1 | 1/2015 | Cohen |
| 2015/0289458 | A1 | 10/2015 | Cohen |
| 2016/0198643 | A1 | 7/2016 | Cohen |
| 2017/0290277 | A1 | 10/2017 | Cohen |
| 2018/0235161 | A1 | 8/2018 | Cohen |

FOREIGN PATENT DOCUMENTS

| | | |
|---|---|---|
| WO | WO 98/10635 | 3/1998 |
| WO | WO 99/33571 | 7/1999 |
| WO | WO 2011/092557 | 8/2011 |
| WO | WO 2012/015655 | 2/2012 |
| WO | WO 2012/038766 | 3/2012 |
| WO | WO 2015/004652 | 1/2015 |
| WO | WO 2016/113739 | 7/2016 |

OTHER PUBLICATIONS

Official Action dated May 17, 2017 From U.S. Appl. No. 14/596,580. (37 pages).
Official Action dated May 8, 2018 From U.S. Appl. No. 15/480,404. (18 pages).
Restriction Official Action dated Feb. 21, 2018 From U.S. Appl. No. 15/480,404.(5 pages).
Notification of Office Action and Search Report dated Sep. 28, 2017 From the State Intellectual Property Office of the People's Republic of China Re. Application No. 201480039100.3 and Its Summary in English. (14 pages).
International Preliminary Report on Patentability dated Apr. 20, 2017 From the International Preliminary Examining Authority Re. Application No. PCT/IL2016/050045. (21 Pages).
Examination Report dated Mar. 14, 2017 From the Australian Government, IP Australia Re. Application No. 2014288784. (2 Pages).
Restriction Official Action dated Feb. 22, 2017 From U.S. Appl. No. 14/596,580. (8 Pages).
Written Opinion dated Jan. 25, 2017 From the International Preliminary Examining Authority Re. Application No. PCT/IL2016/050045. (7 Pages).
Communication Relating to the Results of the Partial International Search dated Apr. 7, 2016 From the International Searching Authority Re. Application No. PCT/IL2016/050045.
International Preliminary Report on Patentability dated Jan. 21, 2016 From the International Bureau of WIPO Re. Application No. PCT/IL2014/050586.
International Search Report and the Written Opinion dated Nov. 5, 2014 From the International Searching Authority Re. Application No. PCT/IL2014/050586.
International Search Report and the Written Opinion dated Jun. 14, 2016 From the International Searching Authority Re. Application No. PCT/IL2016/050045.
Notice of Allowance dated Jun. 2, 2016 From U.S. Appl. No. 13/937,294.
Official Action dated Jan. 13, 2016 From U.S. Appl. No. 13/937,294.
Official Action dated Jul. 16, 2015 From U.S. Appl. No. 13/937,294.
Official Action dated Jun. 29, 2016 From U.S. Appl. No. 14/746,868.
Restriction Official Action dated Apr. 6, 2016 From U.S. Appl. No. 14/746,868.
Restriction Official Action dated Apr. 16, 2015 From U.S. Appl. No. 13/937,294.
Office Action dated May 31, 2018 From the State Intellectual Property Office of the People's Republic of China Re. Application No. 201480039100.3 and Its Translation of the Notification of Office Action Into English. ().
Translation dated Jul. 3, 2018 of Notification of Office Action dated May 31, 2018 From the State Intellectual Property Office of the People's Republic of China Re. Application No. 201480039100.3. (16 Pages).
Translation of Notification of Office Action dated Sep. 28, 2017 From the State Intellectual Property Office of the People's Republic of China Re. Application No. 201480039100.3. (14 Pages).
Notification of Office Action and Search Report dated May 31, 2018 From the State Intellectual Property Office of the People's Republic of China Re. Application No. 201480039100.3. (14 Pages).
Notice of Allowance dated Dec. 21, 2017 From U.S. Appl. No. 14/596,580. (19 pages).
Notification of Office Action dated Dec. 14, 2018 From the State Intellectual Property Office of the People's Republic of China Re. Application No. 201480039100.3. (14 Pages).
Official Action dated Jan. 3, 2019 From U.S. Appl. No. 15/480,404. (16 pages).
Examination Report Under Sections 12 & 13 of the Patents Act, 1970 and the Patents Rules, 2003 dated Jun. 28, 2019 From the Government of India, Intellectual Property India, Patents, Designs, Trade Marks, Geographical Indications Re. Application No. 3296/MUMNP/2015. (6 Pages).
Notification of Office Action and Search Report dated Jul. 5, 2019 From the State Intellectual Property Office of the Peoples Republic of China Re. Application No. 201680003742.7. (11 Pages).
Translation Dated Jul. 14, 2019 of Notification of Office Action dated Jul. 5, 2019 From the State Intellectual Property Office of the People's Republic of China Re. Application No. 201680003742.7. (6 Pages).

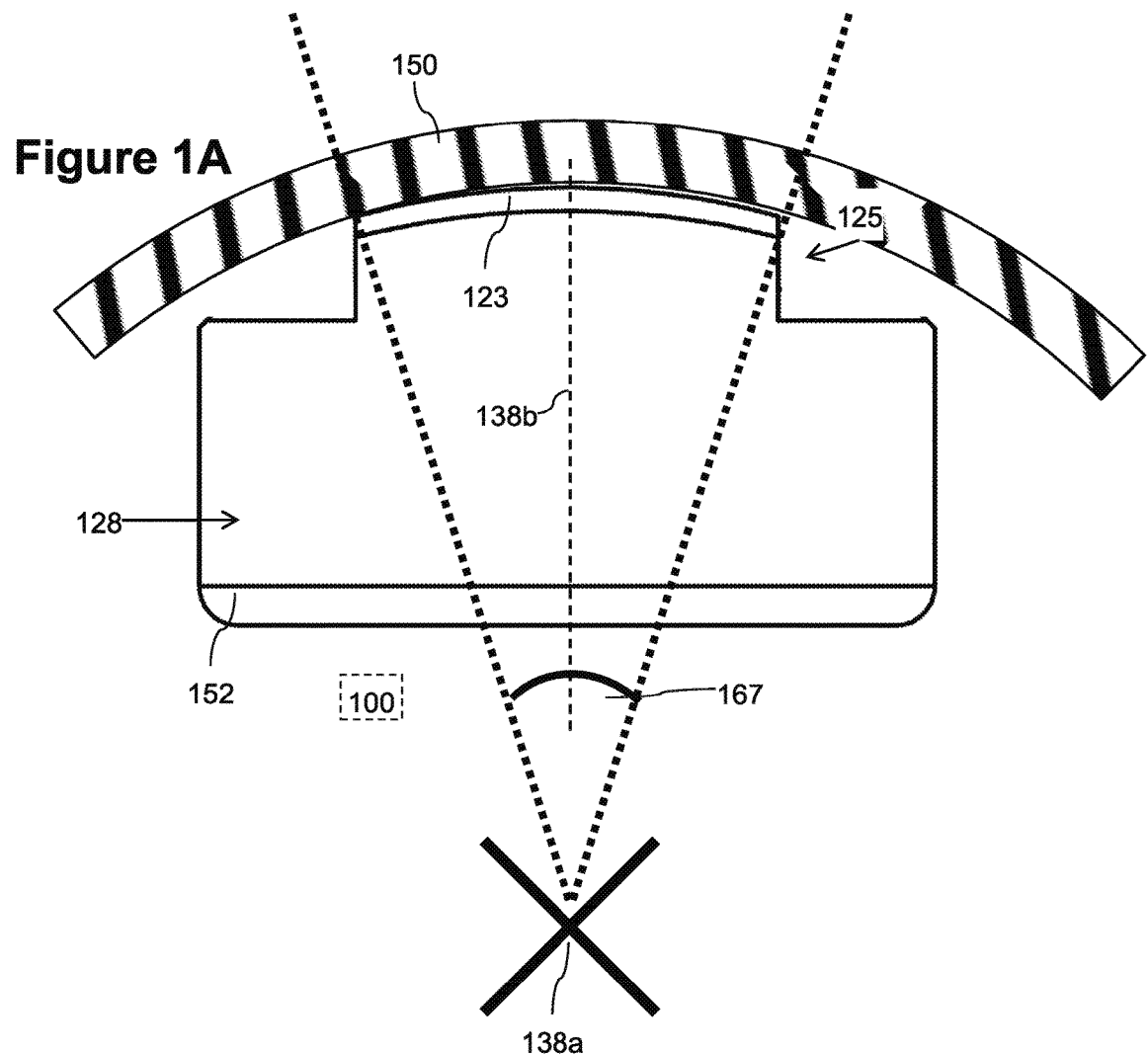

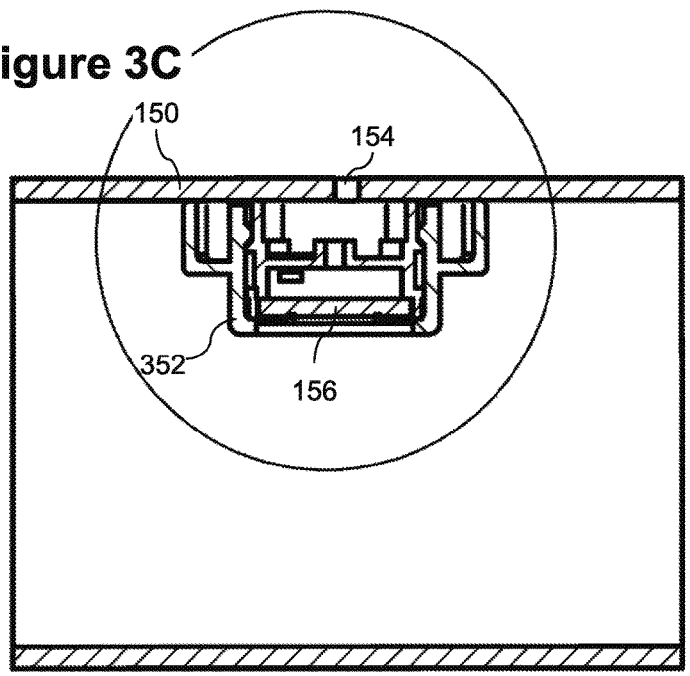
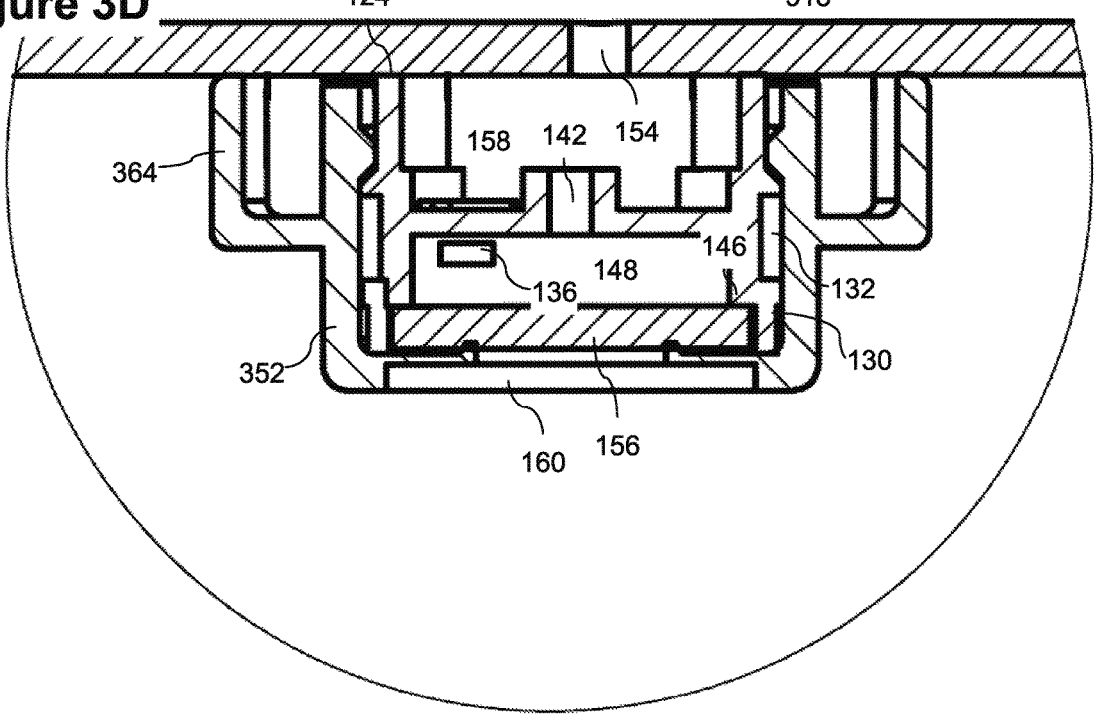

IN LINE BUTTON DRIP EMITTER

RELATED APPLICATIONS

This application is a continuation of U.S. patent application Ser. No. 13/937,294 filed on Jul. 9, 2013, the contents of which are incorporated by reference as if fully set forth herein in their entirety.

FIELD AND BACKGROUND OF THE INVENTION

The present invention, in some embodiments thereof, relates to an in hose drip emitter and, more particularly, but not exclusively, an in hose drip emitter having an efficiently shaped regulator.

International Patent Application Publication No. WO/1992/005689 to Dermitzakis discloses "an irrigation pipe with dripping elements soldered to its inner side made of a continuous plastic pipe which does not have however a constant cross-sectional area over its whole length. The dripping element may be designed either as a simple meander or other channel shape or have a pressure-compensating function. In the embodiment with pressure-compensating function, a constant water outflow rate from the dripping element is ensured within a determined pressure range. The dripping elements are successively introduced into the pipe during the production phase of the latter, are enveloped by the sheath of the pipe and secured to the inner wall of the pipe. The sheath of the pipe forms outer bulges at these locations. The cross-section of the irrigation pipe remains absolutely free over its whole length. The dripping element may also be provided with a small water outlet pipe which clearly projects from the outer side of the pipe."

U.S. Pat. No. 7,270,280 to Belford discloses "an integral in-line dripper to be used bonded to the internal surface of an irrigation pipe. The dripper has an inlet facing the inside of the pipe and an outlet connected to an exit opening in the pipe wall. The dripper has a flattened shape defined between a first surface with an open meandering channel formed therein, the channel's inlet being connected to the dripper's inlet, and a second surface opposite the first surface. The topography of the first surface is so designed that the dripper can be bonded to the internal surface of the pipe in any orientation about a radius of the pipe passing through the first and the second surface, so as to form a flow-restriction labyrinth connected to the outlet of the dripper."

U.S. Pat. No. 5,636,797 to Cohen discloses "a drip irrigation emitter including a tube having a plurality of flow control units bonded to its inner face providing a flow control passageway between the interior of the tube and each of a plurality of discharge openings formed through the wall of the tube. Each flow control unit includes a body member bonded to the inner face of the tube, a cover also bonded to the inner face of the tube, and a deformable elastomeric membrane between the body member and cover and defining a pressure-compensated flow control passageway through the flow control unit. A drip irrigation emitter includes a body member having an inlet for receiving pressurized water, an outlet, and a connecting passageway having a plurality of baffles spaced from each other in the direction of the water flow from the inlet to the outlet to define a labyrinth flow path cooperable with a deformable membrane which regulates the flow through the labyrinth flow path in response to the inlet pressure. The baffles are formed with notches in the sides thereof facing the membrane such that the membrane is deformed by an increase in the inlet pressure first into engagement with the sides of the baffles facing the membrane, and then into the notches, to regulate the flow to the outlet." According to Cohen, "The inner face of body member 10 (i.e., the face exposed to the interior of tube 2) is formed with a flat outer rim 13 (FIG. 5) of generally rectangular configuration for seating the cover 30 . . . . The longitudinal side sections 34, 35 of cover 30 are further formed with curved surfaces 34b, 35b, conforming to the curvature of tube 2."

U.S. Pat. No. 6,206,305 and 6,027,048 to Mehoudar disclose "an emitter unit to be integrally bonded to an internal surface of a conduit and comprising an elongated housing, a housing inlet adapted to communicate with an interior of said conduit and a housing outlet adapted to communicate with a conduit outlet. An elongated, flow-restricting flowpath is formed in the housing having a flowpath inlet communicating with the housing inlet and a flowpath outlet communicating with the housing outlet. A resiliently flexible membrane is mounted in the housing which is of closed box-like shape and is constituted by an elongated receiving member and a correspondingly elongated cover member. Projections and recesses are formed along the lengths of elongated rim portions of the members and are directed substantially transversely to longitudinal axes of said members such that projections of one member are adapted to form a close pressure fit within corresponding recesses of the other member."

U.S. Pat. No. 5,279,462 to Mehoudar discloses "an irrigation emitter unit comprising an outer member of substantially cylindrical shape and having a tapering base portion with fluid flow coupling means; an inwardly directed peripherally flanged edge portion of the outer member; an inner member having a body portion of substantially cylindrical shape substantially sealingly fitted within the outer member and having a cover portion formed integrally therewith; a peripheral edge portion of the cover portion juxtaposed below the flanged edge portion of the outer member; an elongated groove formed in the cylindrical surface of the body portion; a cavity formed in the body portion and communicating at one end thereof with a fluid flow inlet; an inwardly directed flange formed integrally with the walls of the cavity; and a resiliently flexible membrane located within the unit."

U.S. Pat. No. 4,209,133 to Mehoudar discloses "a drip level irrigation emitter unit having flow restricting means, a control mechanism, inlet and outlet control chambers of the control mechanism, resiliently flexible membrane sealingly separating the control chambers, the membrane being displaceable with respect to the flow restricting means, the inlet and outlet chambers respectively communicating with an inlet and an outlet of the flow restricting means, the outlet chamber being formed with an outlet aperture of substantially smaller area than that of the membrane, the arrangement being such that upon the liquid pressure in the inlet chamber exceeding the liquid pressure in the outlet chamber by a predetermined amount, the membrane flexes elastically towards the outlet aperture so as to define, with a rim of the aperture, a restricted outflow path thereby limiting variations in the outflow rate."

U.S. Pat. No. 7,681,810 to Keren discloses "an emitter comprising: a plurality of inlet apertures through which liquid enters the emitter; a manifold flow channel into which liquid that passes through the apertures flow; an elastic diaphragm that seats on the manifold flow channel; an outlet aperture through which liquid that enters the emitter exits the emitter; wherein liquid that enters the inlet apertures displaces only a portion of the diaphragm from the manifold channel so that the liquid can leave the manifold channel and flow through the emitter to reach the outlet aperture."

U.S. Patent Application Publication No. 2012/0097254 to Cohen discloses "an apparatus for a self adjusting regulator suited for an irrigation emitter. A curved flow channel is integrated into a concave dome shaped surface. A deformable member deforms to approach the surface to adjust the resistance to flow. The concave dome shaped surface may match a deformed shape of the membrane. Irregularities in the interface between the surface and the deformable member are configured to achieve a desired discharge under varying flow conditions. The deformable member may activate an inlet filter cleaner by pushing a ram and thereby unclogging the filter."

SUMMARY OF THE INVENTION

According to an aspect of some embodiments of the present invention there is provided a drip emitter for bonding to an inner surface of a conduit over less than the circumference thereof of including a body including a cylindrical element having a main axis, a closed perimeter fluid outlet zone bounded by a rim having an arched profile which lies on a substantially cylindrical virtual surface, wherein an axis of the substantially cylindrical virtual surface is substantially perpendicular to the main axis of the cylindrical element; a cover including a cylindrical inner surface and a fluid inlet; a labyrinth flow path confined between the cylindrical element and the cylindrical inner surface and wherein the labyrinth flow path is disposed between the fluid inlet and the closed perimeter fluid outlet zone; and an orientation element indicating an orientation of the arched profile for aligning the arched profile with the inner surface of the conduit.

According to some embodiments of the invention, the drip emitter may further include: a flow regulating element having a flexible membrane.

According to some embodiments of the invention, the cover may further include: a curved bonding surface for bonding the cover to the inner surface of the conduit, and an additional orientation element for aligning the curved bonding surface with the arched profile of the rim.

According to some embodiments of the invention, a plurality of drip emitters may be attached to an inner surface of an irrigation tube, the irrigation tube may include a plurality of openings, each of the openings may be surrounded by the closed perimeter bonding surface of a respective emitter of the plurality of drip emitters.

According to some embodiments of the invention, the emitter may include a self contained button flow restrictor.

According to some embodiments of the invention, the orientation element includes a flat surface aligned with an axis of the conduit.

According to some embodiments of the invention, the arched profile has a width less than a width of the cylindrical element.

According to some embodiments of the invention, a curvature of the arched rim matches a curvature of the inner surface of the conduit.

According to an aspect of some embodiments of the present invention there is provided a drip emitter for bonding to an inner surface of a conduit over less than the circumference thereof of including: a body including a cylindrical outer surface having a main axis, a first set of baffles protruding from the cylindrical outer surface and a closed perimeter fluid outlet zone bounded by a rim having an arched profile which lies on a substantially cylindrical virtual surface; a cover defining a cylindrical cavity and including a second set of baffles protruding inward from an inner surface of the cavity and a fluid inlet; a labyrinth flow path confined between the cylindrical outer surface and the cylindrical inner surface, the labyrinth flow path winding along the external cylindrical surface between the first set of baffles and the second set of baffles and wherein the labyrinth flow path is disposed between the fluid inlet and the closed perimeter fluid outlet, and a first orientation element on the body and a second orientation element on the cover aligning the first set of baffles with the second set of baffles.

According to some embodiments of the invention, the drip emitter further includes a regulator element including a flexible membrane.

According to some embodiments of the invention, arched rim matches a curvature of the inner surface of the conduit and wherein an axis of the substantially cylindrical virtual surface is substantially perpendicular the main axis of the cylindrical element.

According to some embodiments of the invention, a drip irrigation system may include a plurality of drip emitters attached to an inner surface of an irrigation tube, the tube including a plurality of openings, each the opening surrounded by the closed perimeter bonding surface of a respective emitter of the plurality drip emitters.

According to some embodiments of the invention, the labyrinth flow path winds along the first surface.

According to an aspect of some embodiments of the present invention there is provided a drip emitter including: a body including a first surface, a first set of baffles protruding from the first surface and a first bounding base protruding from the first surface; a facing element including a second surface facing the first surface, a second set of baffles protruding from the second surface and a second bounding base protruding from the second surface; a first orientation element on the body and a second orientation element on the facing element wherein the first orientation element is aligned with the second orientation element to align the first set of baffles with the second set of baffles forming a labyrinth flow path confined between the first surface and the second surface and between the first bounding base and the second bounding base.

According to some embodiments of the invention, the labyrinth flow path winds along the first surface.

According to some embodiments of the invention, the first surface is concave and the second surface is convex.

According to some embodiments of the invention, the first surface is substantially cylindrical.

According to some embodiments of the invention, the drip emitter may further include a regulator element including a flexible membrane.

According to some embodiments of the invention, at least one baffle, selected from the group consisting of the first set of baffles and the second set of baffles, contacts both the first face and the second surface.

According to an aspect of some embodiments of the present invention there is provided a drip emitter for bonding to an inner surface of a conduit over a less than the circumference thereof of including: a cover including a fluid inlet and a cylindrical cavity; a body including a cylindrical portion inserted into the cylindrical cavity, a protruding portion, protruding from one end of the cylindrical cavity and terminating with a closed perimeter fluid outlet zone, the closed perimeter fluid outlet zone having a width between 50% to 100% of the diameter of the cylindrical section and the protruding portion indicating an orientation of the closed fluid outlet zone and a regulator in communication with a fluid outlet and including a flexible membrane; and a labyrinth flow path confined between an outer surface of the body and an inner surface of the cylindrical cavity, the labyrinth flow path connecting the fluid inlet to the regulator.

According to some embodiments of the invention, the closed perimeter fluid outlet zone may optionally have a width of between 2 mm and 10 mm.

According to an aspect of some embodiments of the present invention there is provided a drip emitter for bonding to an inner surface of a conduit over less than the circumference thereof of including: a self contained button type flow regulator, and a coupler receiving fluid from the button flow regulator and including a closed perimeter fluid outlet zone bounded by a rim having an arched profile which lies on a substantially cylindrical virtual surface.

According to some embodiments of the invention, an orientation element may indicate an orientation of the arched profile.

According to some embodiments of the invention, the arched profile has a cylindrical curvature matching a curvature of the inner surface of the conduit.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings:

FIG. 1A is a large scale trans-axial cross section of a conduit, illustrating an exemplary drip emitter in accordance with an embodiment of the present invention;

FIG. 3C is an axial cross section of a conduit, illustrating an alternative example of an installed drip emitter in accordance with an embodiment of the present invention;

FIG. 3D is a large scale axial cross section of a conduit, illustrating an alternative example of an installed drip emitter in accordance with an embodiment of the present invention;

DESCRIPTION OF SPECIFIC EMBODIMENTS OF THE INVENTION

Figure 1B:
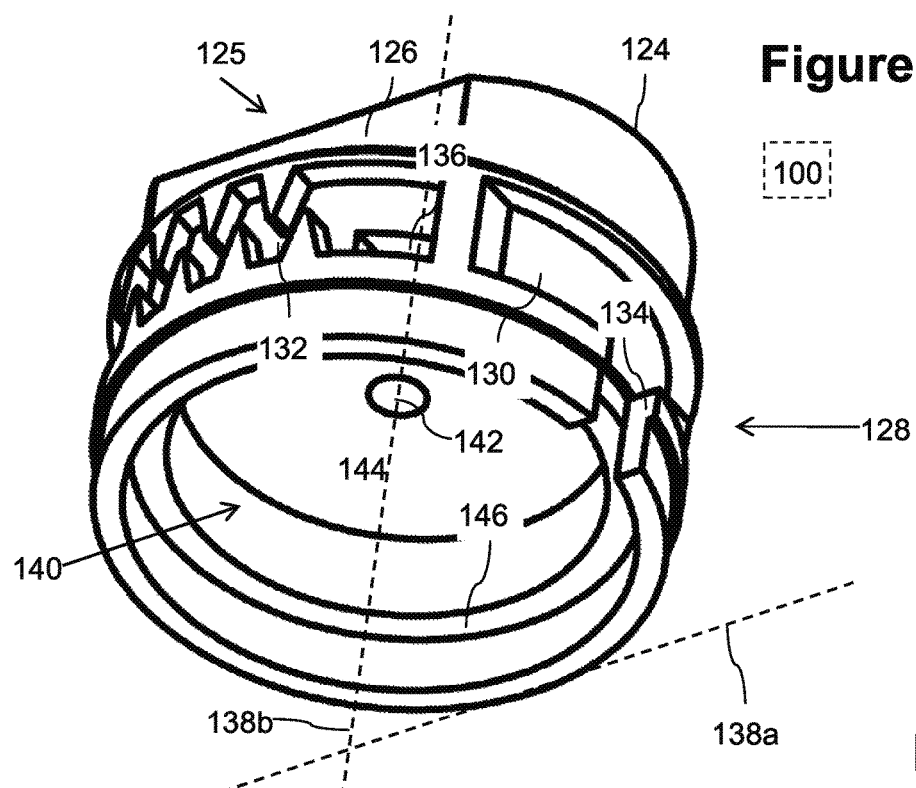
FIG. 1B is a perspective view, illustrating an exemplary drip emitter body in accordance with an embodiment of the present invention.

The present invention, in some embodiments thereof, relates to an in hose drip emitter and, more particularly, but not exclusively, an in hose drip emitter having an efficiently shaped regulator.

Overview

Coupler for Attaching a Button Type Flow Restrictor Inside a Conduit

An aspect of some embodiments the current invention relates to a drip emitter including a fluid outlet coupler adapted for bonding a flow restrictor and to a outlet zone on an inside surface of a fluid conduit. Optionally the flow restrictor may be self contained and/or button type and/or may include a pressure compensating regulator. Features disclosed in some embodiments of the current invention facilitate the aligning and/or bonding of a button dripper to a wall of cylindrical conduit with minimal disturbance to the exterior shape and/or properties of the conduit.

Emitters may be divided into various categories. In line emitters may be installed in a conduit during manufacture. On line emitters may be added to a conduit after manufacture. In line emitters may include embedded restrictors. In line emitters include cylindrical inserts that are attached to the entire inner circumference of the conduit and/or at least half of the inner circumference of the conduit. In line emitters may include embedded emitters that may be embedded into the wall of a conduit. For example the majority of the thickness of an embedded emitter may protrude out from the inner passageway of the conduit.

In line drippers may include flat emitters that are attached to a small portion of the inner circumference of the conduit. Such drippers often have an elongated rectangular form. The majority of the thickness of the emitter may protrude into the inner pathway of the conduit. Emitters may be further divided according to whether they include a self contained flow restrictor. A self contained flow restrictor is not dependent on connection to a conduit wall. Conduit dependent flow restrictors may depends on connection to a conduit wall. For example a conduit dependent flow restrictor may include a pressure reducing labyrinth which employs the conduit wall to confine a labyrinth flow restrictor.

Self contained button emitters (sometimes referred to a cylindrical emitters and/or disk emitters) may be used as on line emitters. Self contained button drippers may have significant advantages. For example button drippers may include a labyrinth flow path set between two cylindrical surfaces. In some embodiments tight sealing cylindrical surfaces can be formed from molded plastic. For example, an initial labyrinth flow path may be formed between two plastic cylindrical surfaces without an expensive flexible membrane and/or gasket. In some embodiments of a button dripper a small flexible membrane may cover only the regulating portion of a flow restrictor. This may save production costs compared to, for example, elongated emitters that in some cases may use a larger membrane to cover and/or seal various portions of the flow restrictor, for example including an initial labyrinth.

The external casing of a button type flow restrictor may be symmetrical about an axis. Many conventional button drippers include an outlet that is also symmetrical around the same axis as the flow restrictor. For example, conventional outlets may have a flat and/or dome shape. There may be a problem bonding a flat surface or a circular dome surface to a cylindrical inner wall of a conduit.

There have been attempts to bond flat or domed button dripper to the inside of a conduit is by locally deforming the conduit and or embedding the emitter mostly and or entirely into the wall of the conduit. Embedding an emitter and/or deformation of the conduit may lead to problems, for example changes in the external properties of the conduit, for example the wall strength, the external cross section, the flexibility, the ability of the conduit to coil. Embedded emitters may require thick walled conduits. Deformation and its associated problems may be increased for larger self contained emitters. Smaller, conduit dependent flow restrictors may be unreliable and/or inconsistent. For example bonding between a conduit dependent flow restrictor and a hose wall may be less precise and/or reliable than molding of plastic parts.

In some embodiments of the present invention the button dripper may include a coupler including an outlet zone with a vaulted and/or arched profile. The arched profile may not have radial symmetry around the same axis as the button flow restrictor. For example, the outlet zone may be arched to conform to a cylindrical inner surface of a hose.

In some embodiments of the present invention, a self contained button flow restrictor may be joined to a coupler for connection to the wall of a conduit as an in line emitter. The self contained button flow restrictor may optionally produce reliable flow without being sensitive to the quality and/or depth of bonding to a conduit. The coupler may optionally include a surface that facilitates alignment and/or bonding to a conduit wall and/or produces an outlet zone that is suited to perforation by automated machinery. The coupler may optionally bond to the wall without significantly changing the external properties of the conduit.

In some embodiments the fluid outlet of the coupler may be shaped to match the inside curvature of the conduit wall. For example, the fluid outlet may include a rim and/or a bonding surface arched to lie on a virtual cylindrical surface. The virtual surface may match the inner cylindrical surface of the conduit. Optionally the coupler surface may bond to less than less than half of the circumference of the conduit. Optionally, fitting the outlet to the curvature of the conduit may allow a larger outlet zone and/or bonding surface with less disturbance to the external properties of the conduit.

In some embodiments an irrigation hose may include a plurality of in hose drip emitters. Optionally, the hose may retain flexibility (for example the bonding zone may be configured so as to not constitute a large inflexible zone). Optionally, the hose may retain a smooth outer geometry, allowing it to be handled and/or stored like conventional hoses. For example the hose may bend enough to be rolled in a standard manner.

In some embodiments, the outlet zone may be suitable for perforation by automated machinery. For example the outlet zone may optionally range between 200 to 500% larger than perforation size. Drippers may be spaced between 100 and 1000 mm apart. The outlet zone may allow for 0.5-2.0% misalignment, which may be useful in automatic perforation. For example the outlet zone may have a width ranging between 2 mm and 10 mm and/or the outlet zone may have a width ranging between 3 mm and 7 mm. For example the zone may occupy an angular extent of less than 20° on the circumference of the conduit. For example the installation of the emitter may change the width of the conduit by less than 5%. Perforation may include for example punching, slicing, cutting and or other technologies.

In some embodiments the dripper may be installed in a hose having an inner diameter of between 5 to 30 mm. For example the dripper may be installed in a hose having a wall thickness of between 0.1 to 4 mm, and more particularly in some embodiment the dripper may be installed into a thin walled hose having a wall thickness of between 0.1 to 1.0 mm. For example the hose with the drippers may have a working pressure range of between for example ranging between 1 to 3 atm or alternatively for example ranging between 0.2 to 4 atm.

In some embodiments the output is regulated in hose drip emitter. For example, the emitter may preserve a substantially constant flow rate ranging between 0.2 to 8 l /hr. For example, it may preserve a constant flow rate of about 0.5, 1, 2, 3, 4, or 8 l /hr. For example, the emitter may preserve the specified output flow rate to ±10% under variations of input pressure ranging between for example 1 to 3 atm or alternatively for example ranging between 0.2 and 4 atm, for example due to changes of elevation along the conduit and/or transient pressure changes and/or changes in pressure along the conduit (due for example to head loss along the conduit). The emitter may optionally include a one way valve to prevent back flow.

In some embodiments an outlet coupler and the body of the flow restrictor may be produced in a single piece of molded plastic. Optionally a bonding surface between the coupler and the inner wall of the conduit may perpendicular to an axis of the flow restrictor. Optionally, the outlet zone and/or the bonding zone may be thinner that the flow restrictor. Optionally, the flow restrictor may be disk and/or cylindrical and/or conical in shape. Optionally the flow restrictor may include pressure compensation.

Orientation Element

An aspect of some embodiments of the current invention is an orientation element for orienting an outlet coupler with an inner surface of a conduit.

When fitting the dripper to the inside surface of the conduit, it may optionally be desirable to align the profile of the bonding surface to the axis of the conduit. A conventional button drip emitter, having axial symmetry, may lack an obvious external feature by which to judge the orientation of the bonding surface and its alignment with the conduit.

In some embodiments of the present invention an optional orientation element may facilitate orientation in one or more axes. For example, a bonding surface may be oriented toward the conduit wall. The bonding surface may optionally be oriented also with respect to the axis of the conduit. For example in some embodiments the bonding surface is curved to fit the internal cylindrical side of the conduit. In such a case, the bonding surface may be oriented parallel to the conduit. For example, an alignment element may include a flat surface and/or a pair of parallel flat surfaces. The flat surface may be aligned with the axis of the conduit. For example, the orientation element may include a step and or a protrusion that is aligned towards a wall of the conduit. In some embodiments the orientation element may be on the outlet coupler and/or on a core of the flow restrictor and/or on a cover thereof.

Two Part Labyrinth

An aspect of some embodiments of the current invention relates to a two part labyrinth. Optionally baffles on each part of a two part labyrinth may be oriented in a single direction. In some embodiments, when assembled together two relatively simple parts may provide a winding labyrinth of baffles having different orientations.

Mold extraction for plastic emitters parts may be made difficult by the inclusion of features having different extraction orientation in a single molded part. For example extraction of conventional labyrinths from molds may be made slow and/or expensive due to the need for movement and/or flexing in multiple directions in order to extract baffles having different orientations. Some embodiments of a two part labyrinth may facilitate production of a labyrinth flow path by forming a labyrinth having baffles of differing orientations with easily molded parts wherein on a given part, feature have similar orientation.

The two part labyrinth may optionally be confined between two parts, for example body having a cylindrical outer surface and a cover having a cylindrical inner cavity.

Optionally intervening baffles on the two parts may form a winding fluid pathway. The fluid pathway may optionally circle the cylindrical surface. The fluid pathway may optionally wind along the cylindrical surface.

Alternatively or additionally, the cylindrical surface may include a conical portion and/or an irregular convex portion. For the sake of the description herein, cylindrical may include for example a truncated cone having an aperture of 0-10°. Optionally the directrix of the cylinder may not be circular.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

Exemplary Embodiments

Exemplary Emitter Bonded to Conduit

FIG. 1A is an orthogonal trans-axial profile view of an exemplary embodiment 100 of a button flow restrictor 128 and coupler 125 installed in a conduit. A curved bonding surface 123 (for example on a cover 152) is optionally shaped to make good contact with the inner cylindrical surface of conduit wall 150 without significantly deforming the conduit. For example bonding surface 123 may have a cylindrical curvature. The curvature of bonding surface may optionally match the curvature of the conduit. For example, an X in FIG. 1A marks the axis 138a of curvature of bonding surface 123 (directed out of the page) which is optionally corresponds also the axis of the conduit. A dashed line marks the axis 138b of the cylindrical element flow restrictor 128. The outside of embodiment 100 is optionally enclosed by a cover 152. In the exemplary embodiment, outlet coupler 125 connects a cylindrical element flow restrictor 128 to the conduit. Alternatively or additionally, an adaptor may be used to connect flow restrictors having arbitrary shapes to an inside wall of a conduit.

FIG. 1B illustrates an emitter body according to exemplary embodiment 100 of the current invention. Embodiment 100 includes an outlet coupler 125 including an optional closed perimeter rim 124. Rim 124 may be have an arched profile (for example similar to that illustrated in FIG. 1A) that lies on a substantially cylindrical virtual surface (for example the virtual surface may deviate from cylindrical by 5% and/or between 0.5 and 1.0 mm and/or between less than 0.5 mm in some embodiments deviation may be more or less). For example, the arched profile may be shaped to fit the cylindrical inner wall of a conduit.

In some embodiments, for example embodiment 100, flow restrictor 128 may be in the form of a self contained button type regulated restrictor. The external casing of a button type flow restrictor, for example restrictor 128 may for example have axial symmetry around axis 138b. The natural form for an outlet to such a restrictor is also axial symmetrical around axis 138b (which would include for example a dome shape). In embodiment 100, rim 124 of the outlet zone does not have radial symmetry around axis 138b, but is arched to fit a hose with radial symmetry around axis 138a (perpendicular to axis 138b).

When fitting rim 124 of coupler 125 to an inside surface of a conduit, it may optionally be desirable to align the axis 138b of the arched form of rim 124 to the axis of the conduit. A conventional button drip emitter, having external symmetry around axis 138b, may lack an obvious external feature by which to judge the orientation of axis 138a and its alignment with the conduit.

Some embodiments of the present invention may include an orientation member. For example, a flat surface serves may serve as an alignment member 126. For example, the flat surface may be aligned with an axis of the substantially cylindrical virtual surface. Optionally in exemplary embodiment 100, rim 124 is oriented towards to wall of the conduit. The flat surface of orientation element 126 may optionally be aligned parallel to the axis of the conduit. The arched bonding surface may be aligned to the conduit (for example by aligning the axis of the substantially cylindrical virtual surface to the axis of the conduit).

In some embodiments, a cylindrical element regulated button type flow restrictor 128 may be joined to outlet coupler 125. Flow restrictor 128 may be self contained. For example the restricting properties of flow restrictor 128 may be independent its connection to the conduit. Cylindrical element flow restrictor 128 may optionally have a main axis 138*b* that is substantially perpendicular to axis of curvature 138*a* of the cylindrical arch of curved bonding surface, rim 124. For example the angle between axis 138*a* and axis 138*b* may be 90°±10°. Optionally the axes 138*a* of the curved bonding surface 123, and the cylindrical bonding surface of rim 124 of the emitter body and/or cover 152 may correspond to the axis of the conduit.

In exemplary embodiment 100, restrictor 128 includes a regulating member 140 and a tortuous flow channel 132 that is wrapped around a cylindrical surface 130. The fluid path may include for example a channel inlet 134 leading to tortuous channel 132. Tortuous channel 132 may optionally lead to a channel outlet 136 which is also optionally a regulator inlet. Flow may cross optionally a regulating surface 144 and exit from a through a regulator outlet 142. In some embodiments, the body may include a shoulder 146. Shoulder 146 may optionally support a membrane as will be explained herein below.

An angular extent 167 of a boding zone is illustrated by dotted lines and angle markings in FIG. 1A. The angular extent 167 of the boding zone may be, for example less than 45°. Alternatively or additionally, in some embodiments, the angular extent of the bonding zone may be between 20° and 180°. Alternatively or additionally, in some embodiments, the angular extent of the bonding zone may be greater than 180°.

Outlet Zone

Figure 1C:
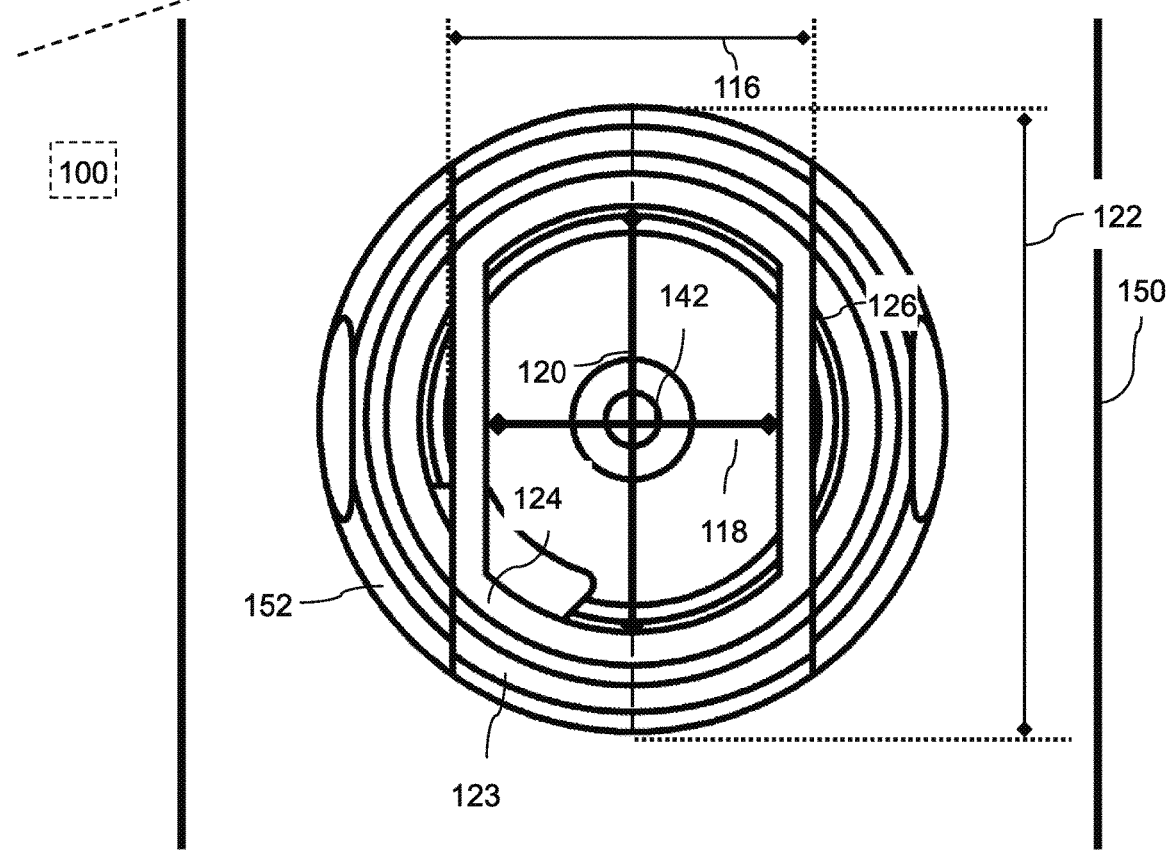
FIG. 1C is an axial view of the outlet side of an exemplary drip emitter in accordance with an embodiment of the present invention.

FIG. 1C illustrates an outlet zone of exemplary embodiment 100 of a drip emitter. The outlet zone is optionally defined by the inner perimeter rim 124 on the body of the drip emitter. The bonding zone is optionally defined by the outer perimeter of rim 124 on the body of the drip emitter and/or the outer perimeter of bonding surface 123 on the cover 152. In exemplary embodiment 100, the length 120 of the outlet zone is parallel to the axis of the conduit and/or the width 118 of the outlet zone is perpendicular to the axis of the conduit. In exemplary embodiment 100, the length 122 of the bonding zone is parallel to the axis of the conduit and/or the width 116 of the bonding zone is perpendicular to the axis of the conduit. In exemplary embodiment 100 the length 122 of outlet zone along the axis of the conduit is optionally longer than the width 116 of the bonding zone perpendicular to the axis of the conduit. In the example of embodiment 100 the outlet zone is optionally bounded by parallel flat surfaces that may optionally serve as orientation elements 126. For example, the flat surface of orientation element 126 may be aligned with the axis of the conduit. Aligning the orientation element may align arched rim 124 to the conduit. For example, the axis of the conduit may be aligned to axis 138*a* of the substantially cylindrical virtual surface on which lies arched rim 124.

Cut Away View of an Emitter Installed in a Conduit

Figure 1D:
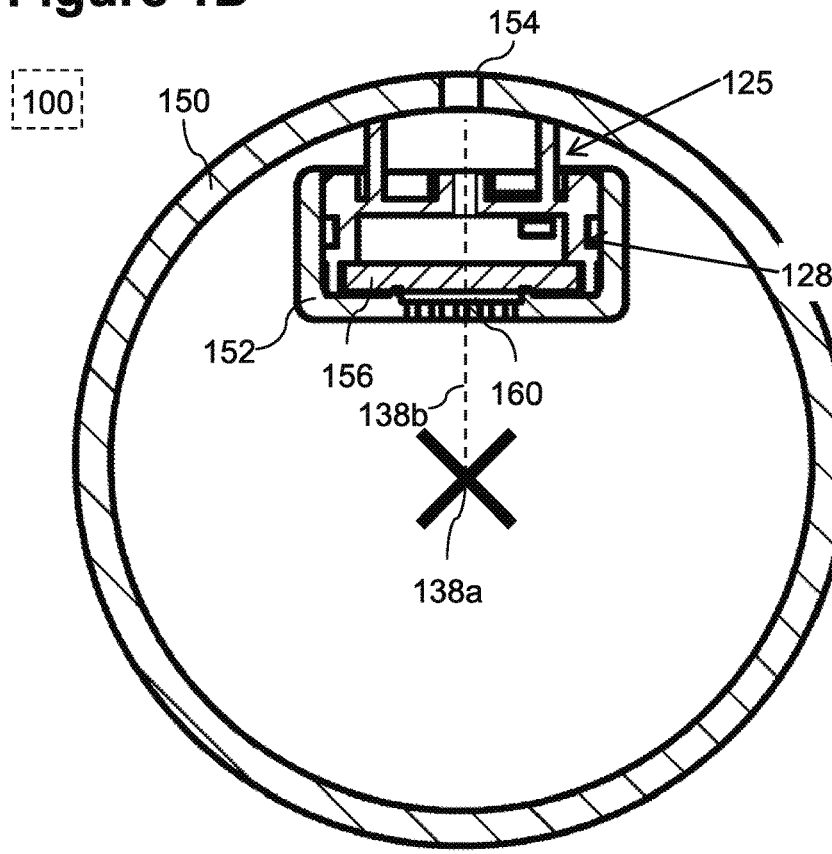
FIG. 1D is a trans-axial cross section of a conduit, illustrating an example of an installed drip emitter in accordance with an embodiment of the present invention.
Figure 1E:
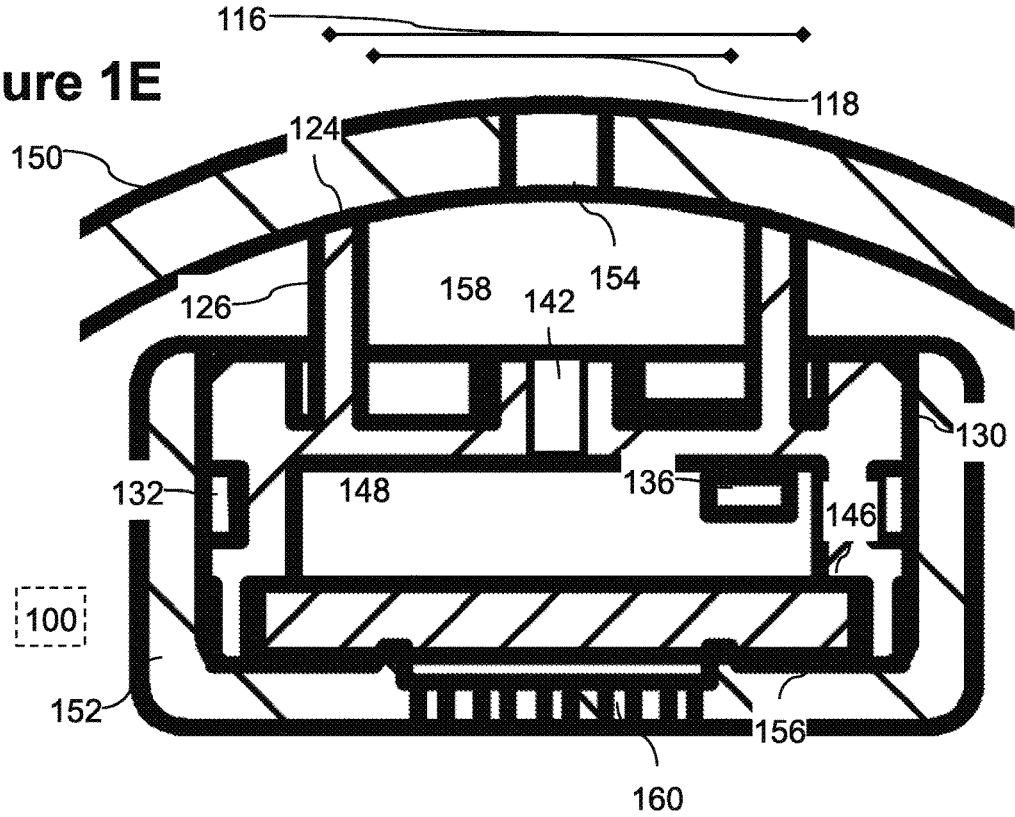
FIG. 1E is a large scale trans-axial cross section of a conduit, illustrating an example of an installed drip emitter in accordance with an embodiment of the present invention.

FIGS. 1D and 1E illustrate large scale and detailed trans-axial cross sectional views of exemplary embodiment 100 installed in a conduit. FIGS. 1D 1E illustrate an optional flexible membrane 156 not under pressure. FIG. 1E illustrates a flow path through the emitter.

In FIG. 1E an exemplary membrane 156 is shown not under pressure. For example, pressure in the conduit may deflect membrane 156 away from fluid inlet 160 allowing water to enter inlet 160 and flow through a channel inlet into tortuous channel 132. In the exemplary embodiment tortuous channel winds around cylindrical surface 130 is confined between cover 152 and cylindrical surface 130. Subsequently, the fluid optionally passes through channel outlet 136 into a regulatory cavity 148 and out regulator outlet 142 into an outlet chamber 158 and eventually out opening 154 in the conduit. As pressure in the conduit rises, membrane 156 may be displaced further eventually partially blocking regulator outlet 142 maintaining a constant flow output. The width 116 of the bonding zone and the width 118 of the outlet zone are illustrated by dimension lines.

In the embodiment of FIGS. 1D 1E cover 152 may optionally snap onto the body of the dripper.

Cover

Figure 1F:
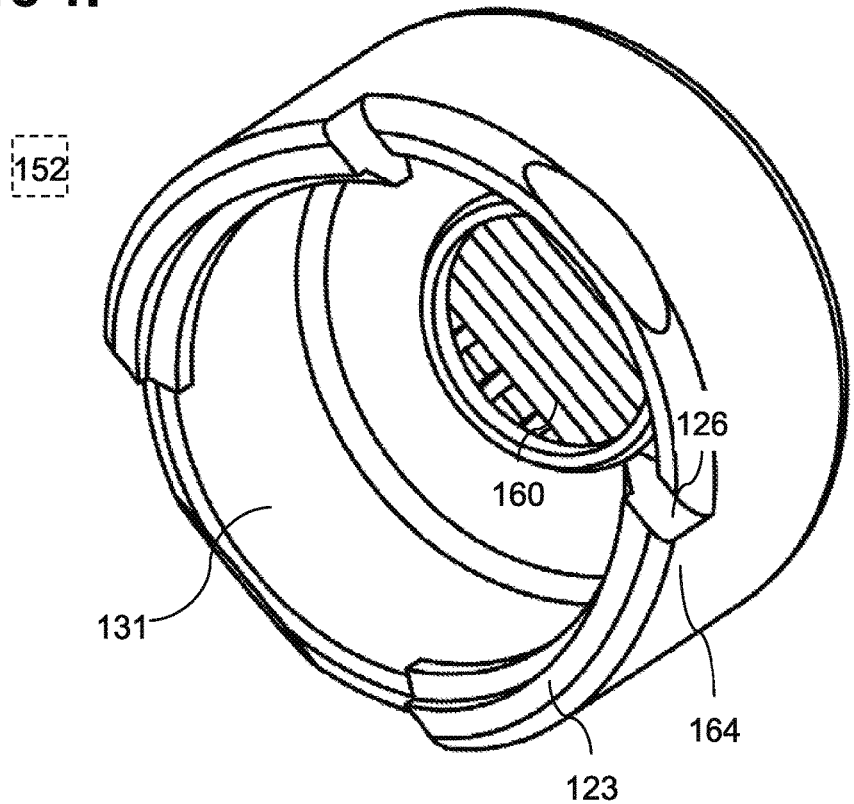
FIG. 1F is a perspective view, illustrating the cavity of a cover in accordance with an embodiment of the present invention.

FIG. 1F illustrates an exemplary embodiment of cover 152. For example, cover 152 may include wings 164 for orientation and/or connection to the body of the emitter. Alternatively or additionally, a cover may be simple without wings and/or an orientation member and/or a curved surface for bonding to the conduit wall. For example the orientation and/or connection to the conduit wall may be supplied only by the body of the emitter. Optionally, cover 152 may include a curved bonding surface 123 that may fit and/or be bonded to the inside surface of a conduit. Surface 123 may for example increase the size of the bonding zone with a conduit without changing the size of the outlet zone. Surface 123 may for example increase the strength of bonding with a conduit. Optionally, cover 152 may include optional orientation elements 126.

Cover 152 may include an optional cylindrical cavity into which cylindrical element flow restrictor 128 may be inserted. For example, the cylindrical cavity may be bounded by a cylindrical inner surface 131. In the exemplary embodiment of FIGS. 1A-I, when cylindrical element flow restrictor 128 is inserted into cover 152, a labyrinth flow path, for example including tortuous channel 132, is confined between cylindrical surface 130 and cylindrical inner surface 131.

Assembled Emitter—View of the Outlet

Figure 1G:
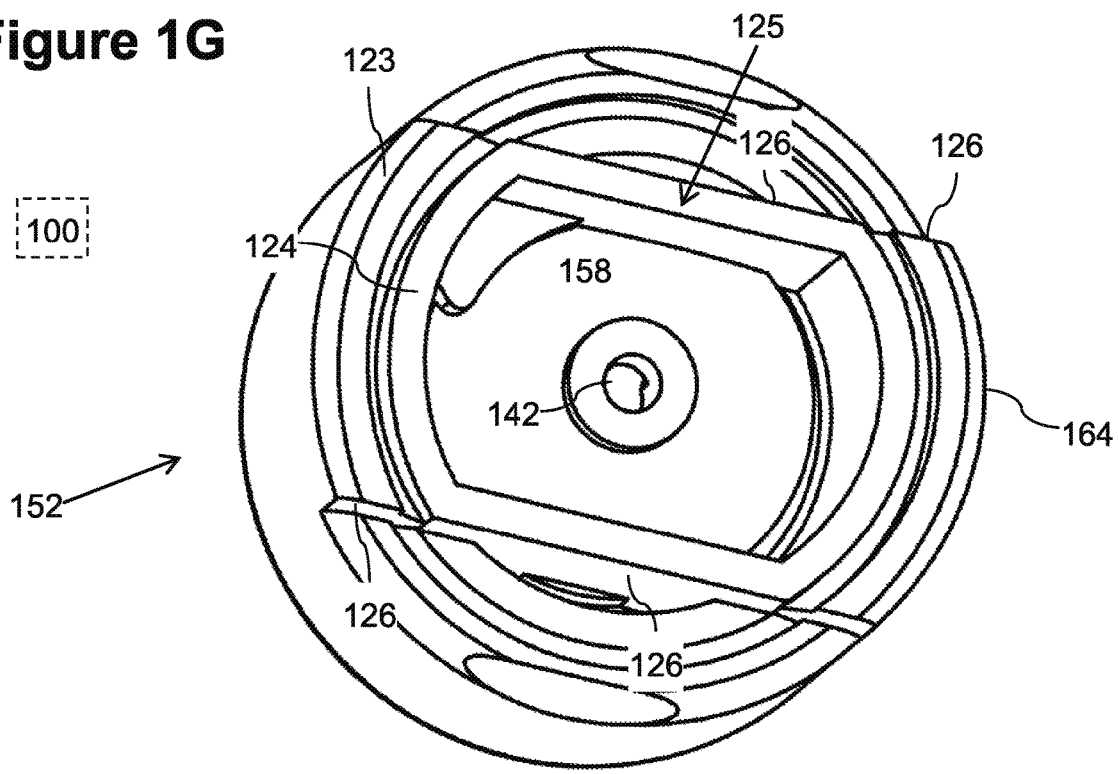
FIG. 1G is a perspective view, illustrating a coupler installed into a cover in accordance with an embodiment of the present invention.

FIG. 1G is a view of outlet coupler 125 side of an assembled dripper according to exemplary embodiment 100. FIG. 1G illustrates the form of outlet chamber 158 and orientation features of exemplary embodiment 100 on two axes.

In some embodiments, outlet coupler 125 may be oriented along more than one axis. For example, outlet coupler 125 may be oriented facing wall 150 of the conduit (with inlet 160 facing the center of the conduit). For example, the straight surfaces of orientation elements 126 may be orientated parallel to the axis of the conduit. When outlet coupler 125 is bonded to a conduit wall 150, rim 124 may optionally surround an opening in the hose on all sides. For example outlet chamber 158 may be surrounded on five sides by the emitter body. For example on two sides by the arched profile portion of rim 124 and on two more sides by parallel orientation members 126 portion of rim 124 and on the fifth side by the floor of regulating chamber 148. On the sixth side, chamber 158 may be closed in by wall 150 of the conduit. The parallel sides of orientation elements 126 may optionally be designed for simple orientation by, for example, mechanical and/or optical means.

Inlet and Cover

Figure 1H:
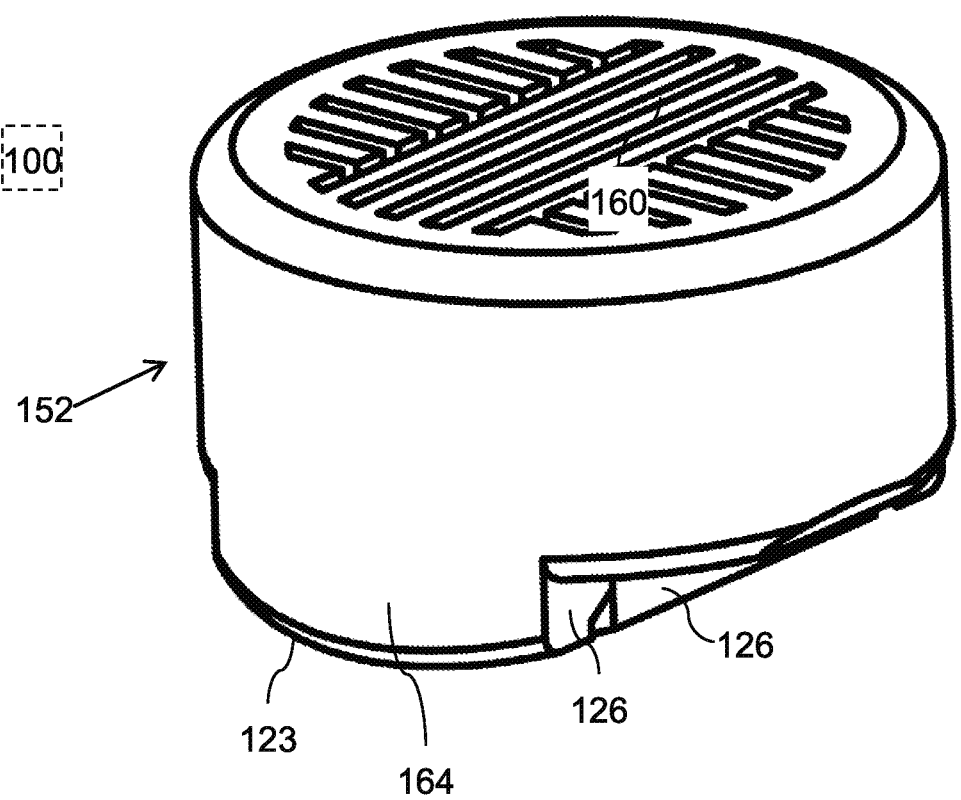
FIG. 1H is a perspective view, illustrating a dripper in accordance with an embodiment of the present invention.

FIG. 1H illustrates a view from the inlet side of exemplary embodiment 100. Illustrated optional orientation features of cover 152 include wing 164 and orientation element 126. Also seen is curved bonding surface 123 which may optional fit the interior surface of the conduit. Orientation element 126 of the body of the dripper is seen in parallel orientation with orientation element 126 of cover 152.

An Alternative Regulator

Figure 1I:
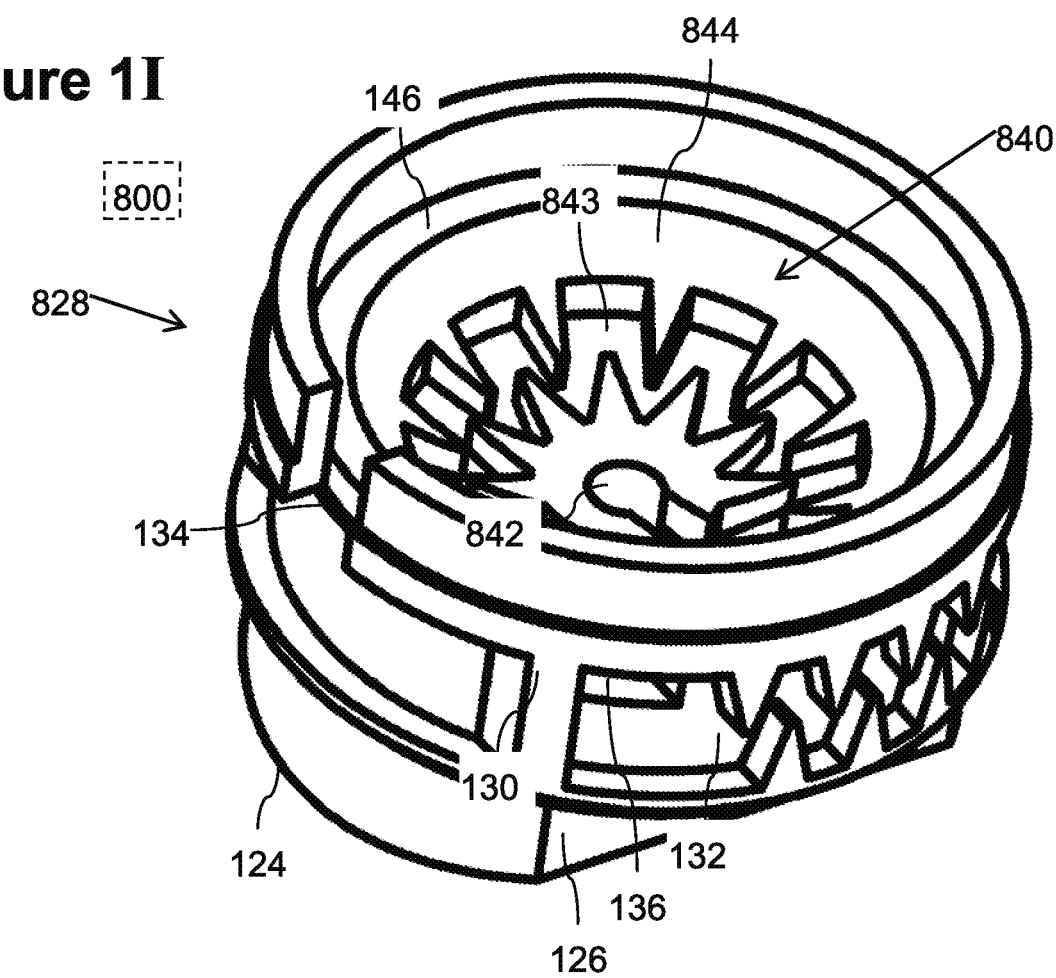
FIG. 1I is a perspective view, illustrating an exemplary drip emitter body in accordance with an embodiment of the present invention.

FIG. 1I illustrates a body of an alternative exemplary embodiment 800 of a cylindrical element flow restrictor 828. Exemplary flow restrictor 828 includes an alternative regulator element 840. Under low conduit pressures fluid entering channel outlet 136 of embodiment 800 flows directly between a membrane (156 not shown) and a regulating surface 844 to a regulator outlet 842. When the pressure in the conduit rises, membrane 156 distends toward surface 844 and flow from channel outlet 136 passes through a regulator labyrinth 843 to reach outlet 842.

A Two Part Labyrinth

Figure 2A:
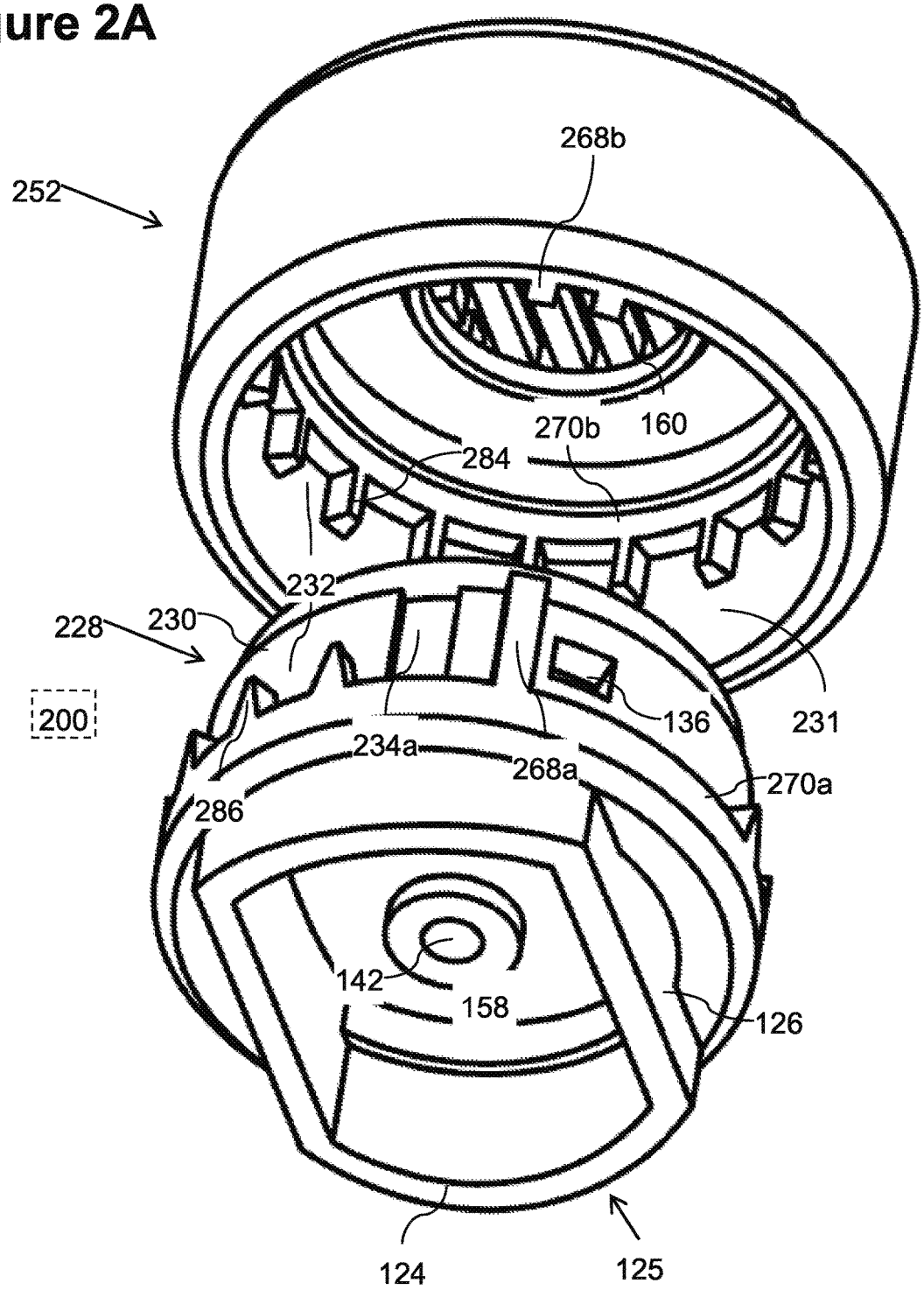
FIG. 2A is a perspective view, illustrating a two part labyrinth drip emitter body and cover in accordance with an embodiment of the present invention.

FIG. 2A illustrates an exemplary embodiment 200 of an emitter including a two part labyrinth flow path 232. In exemplary embodiment 200, two part labyrinth flow path 232 is confined between a cylindrical outer surface 230 of a body and a cylindrical inner surface 231 of a cover 252. Flow path 232 is made to wind along cylindrical surface 230 by cover baffles 284 intervening between oppositely oriented core baffles 286. For example, baffles 284 may be aligned with the axis of cylindrical flow restrictor 228 in a first direction and baffles 286 may be aligned with the axis of cylindrical flow restrictor 228 in an opposite direction. In the example of embodiment 200 molding of the cover 252 and cylindrical element flow restrictor 228 may be facilitated by the fact that the openings between baffles 284, 286 on each piece are optionally directed in one direction. In some embodiments this may simplify the mold and/or increase the production rate. For example, in FIG. 2A, baffles 284 are oriented along the axis of the cylindrical cavity of cover 252 with tips facing downward. For example, in FIG. 2A, baffles 286 are oriented along the axis of the cylindrical element flow restrictor 228 with tips upward.

In exemplary embodiment, baffles 286 are connected to a bounding base 270a. Bounding base 270a serves as a sealing ring. When cylindrical flow restrictor 225 is inserted into the cavity of cover 252 bounding base 270a optionally seals against inner cylindrical surface 231 demarking the bottom edge of labyrinth flow path 232. In exemplary embodiment, baffles 284 are connected to a bounding base 270b. Bounding base 270b serves as a sealing ring. When cylindrical flow restrictor 225 is inserted into the cavity of cover 252 bounding base 270b optionally seals against cylindrical surface 230 demarking the top edge of labyrinth flow path 232.

Exemplary embodiment 200 optionally includes interlocking dividers 268a and 268b on surface 230 and 231 respectively. Dividers 268a,b may optionally prevent fluid that enters channel inlet 234a from short circuiting labyrinth 232 to exit channel outlet 136.

Outlet coupler 125 of embodiment 200 is optionally similar to outlet coupler 125 of embodiment 100. Cover 252 optionally does not include a bonding surface for bonding to a wall of a conduit. Alternatively or additionally, a cover of a two part labyrinth could include wings (for example wings 164 and/or 1064) and or a bonding surface (for example similar to surface 123 and 1024).

In exemplary embodiment 200 cover 252 is illustrated without wings. Alternatively or additionally a cover of a two part labyrinth may have wings, for example line wings 164 of embodiment 100.

Orientation During Assembly of a Two Part Labyrinth

Figure 2B:
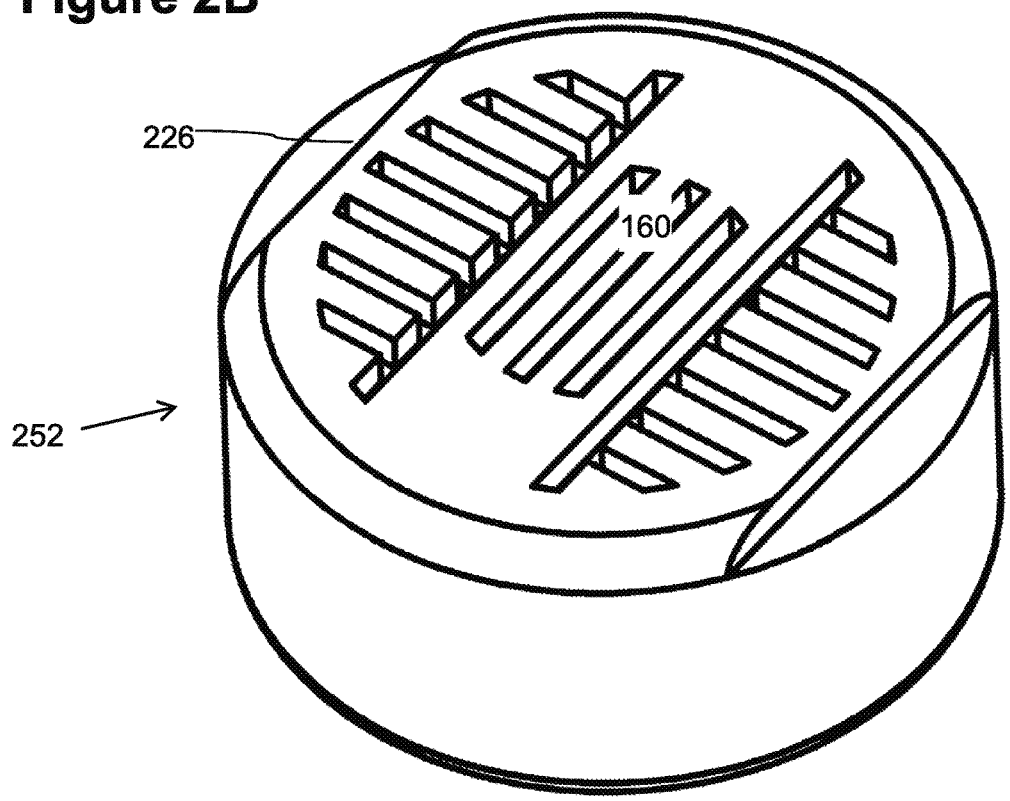
FIG. 2B is a perspective view, illustrating a an exemplary cover of a two part labyrinth drip emitter cover in accordance with an embodiment of the present invention.
Figure 2C:
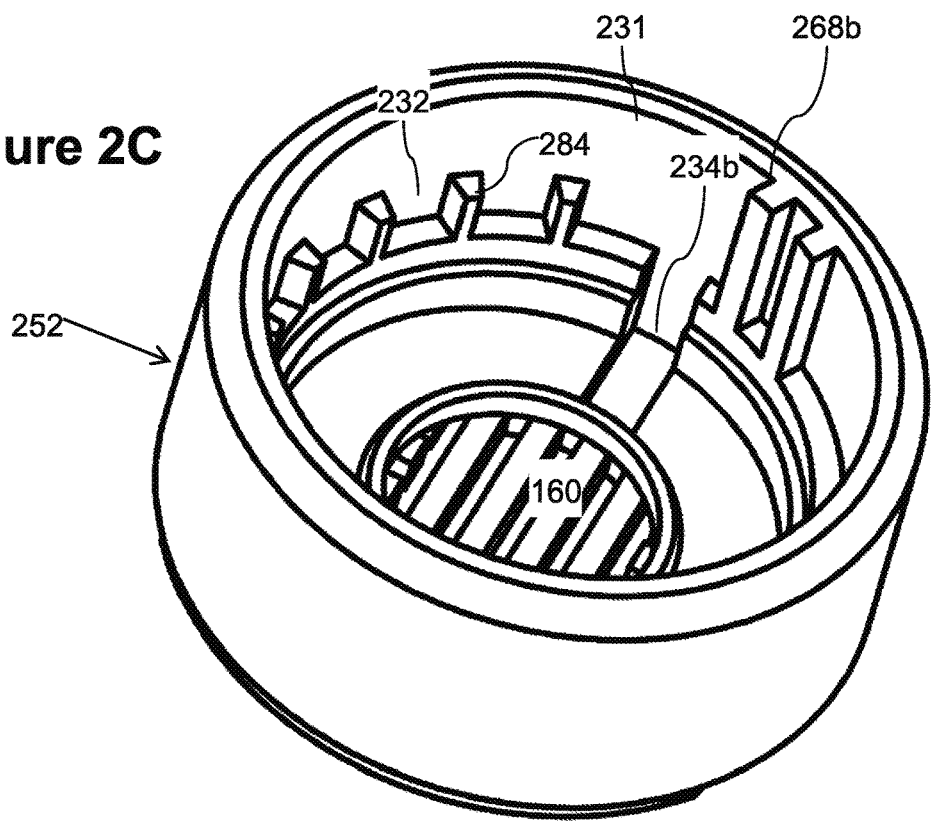
FIG. 2C is a perspective view, illustrating a an exemplary cavity in a cover of a two part labyrinth drip emitter cover in accordance with an embodiment of the present invention.

FIGS. 2B and 2C illustrate the outside and inside surfaces respectively of exemplary cover 252. FIGS. 2B,C illustrate a few optional orientation features of cover 252. In some embodiments, orientation of cover 252, flow restrictor 228, outlet coupler 125 and conduit wall 150 and/or the alignment between them may be of importance. Alignment may optionally be achieved using automatic machinery. Alignment may optionally be facilitated by various orientation elements, for example as described herein.

For example, FIG. 2B illustrates an exemplary orientation element 226 on cover 252. Element 226 may be used by a machine during assembly of the emitter to orient cover 252 and align it with flow restrictor 228. Optionally, element 226 may be used by a machine bonding emitters to a conduit to orient outlet coupler 125 and/or align it with the axis of the conduit, for example when outlet coupler 125 is in a fixed alignment with cover 252 (as is the case for example in embodiment 200).

Interlocking dividers 268a,b may optionally lock surface 230 into proper rotational alignment with cover 252. Locking surface 230 into rotational alignment with surface 230 may optionally facilitate the proper intermeshing of baffles 284 and 286. Locking surface 230 into rotational alignment with surface 231 may optionally align a channel inlet 234b groove in cover 252 with channel inlet 234a on the body of the emitter.

Alternate Body of a Two Part Labyrinth

Figure 2D:
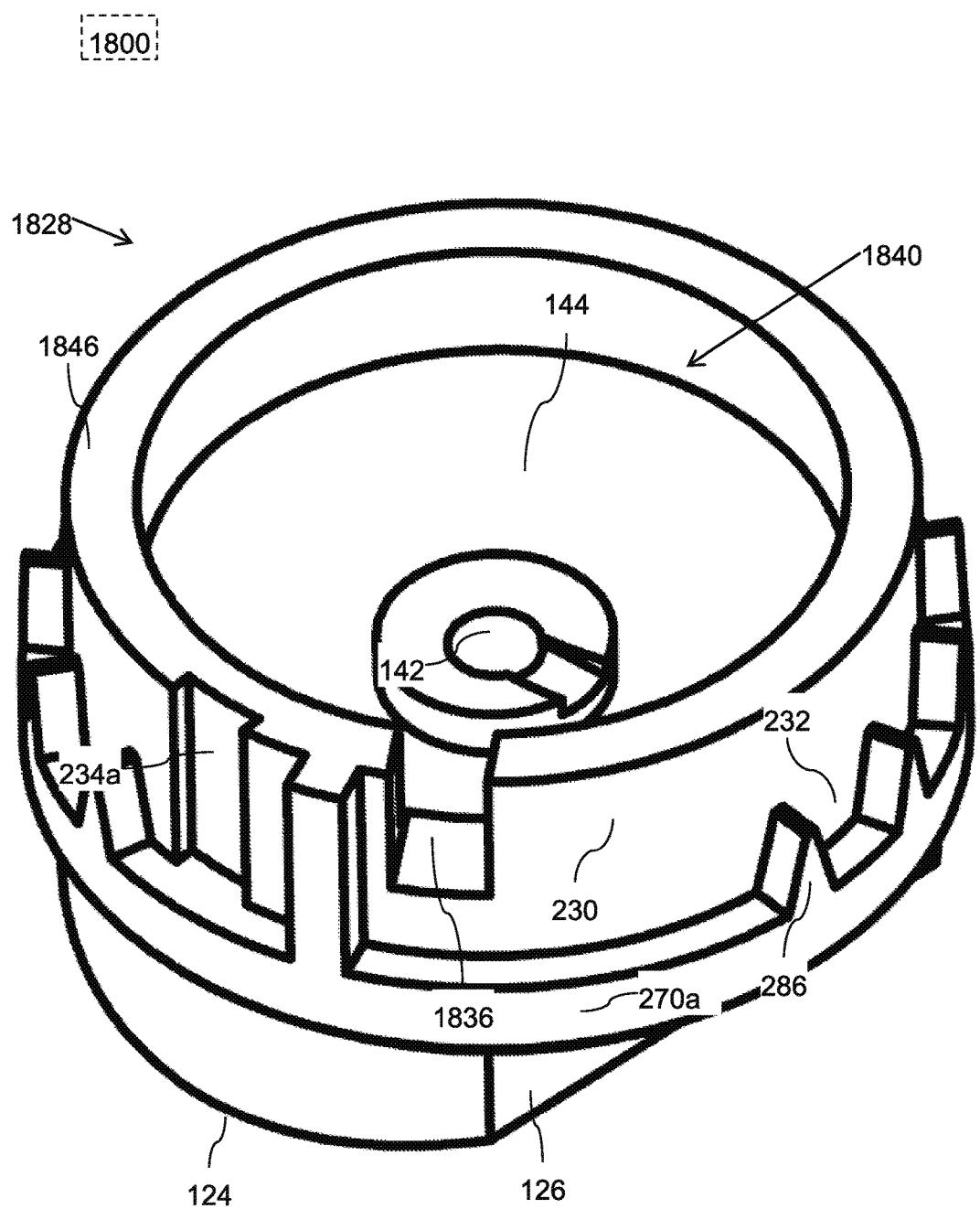
FIG. 2D is a perspective view, illustrating an inner body part of an alternative two part labyrinth drip emitter in accordance with an embodiment of the present invention.

FIG. 2D illustrates an alternative embodiment 1800 of a body of an emitter having a two part labyrinth. The cylindrical flow resistor 1828 of embodiment 1800 includes a slit channel outlet 1836. A flexible membrane (for example membrane 156) may optionally sit on top of shoulder 1846 and/or channel outlet 236, optionally dividing channel outlet 1836 from inlet 160. One possible advantage of using a slit as a channel outlet 1836 over using a hole for example 136 is that it may be easier to mold the slit than a hole (for example a slit can be molding without requiring an additional molding movement direction. In embodiment 1800, flow restrictor 1828 is illustrated with a smooth regulating surface 144. Alternatively or additionally embodiment 1800 could include a labyrinth regulating surface, for example like regulating surface 844.

An Alternative Cover Geometry

Figure 3A:
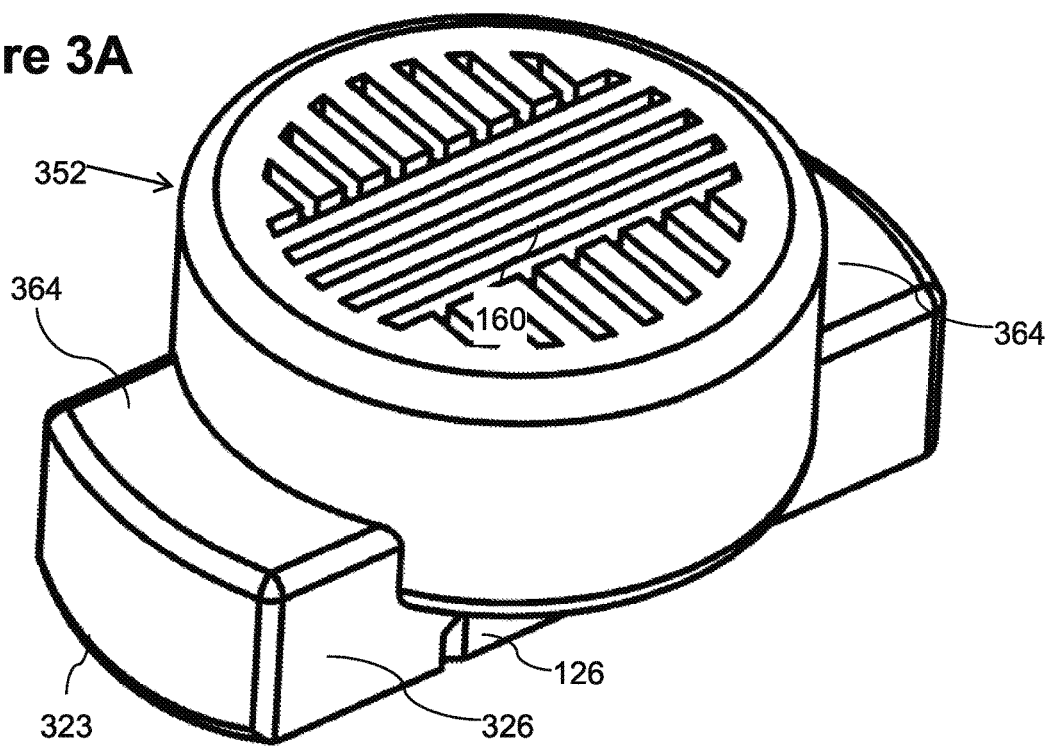
FIG. 3A is a perspective view, illustrating an alternative dripper in accordance with an embodiment of the present invention.

FIG. 3A illustrates an alternative cover geometry according to an exemplary embodiment of the current invention. Cover 352 may optionally fit the same body and/or conduit as embodiment 100. Cover 352 may differ from cover 152 for example in that cover 352 has larger wings 364 and a larger orientation element 326 than cover 152. Cover 352 may optionally have a large area of curved bonding surface 323 for bonding to the inner wall of the conduit. Alternatively or additionally a cover with larger wings (for example like wings 364) may also be a part of a two part labyrinth (for example the flow restrictor may be similar to flow restrictor 228).

Assembled Emitter—View of the Outlet with an Alternative Cover

Figure 3B:
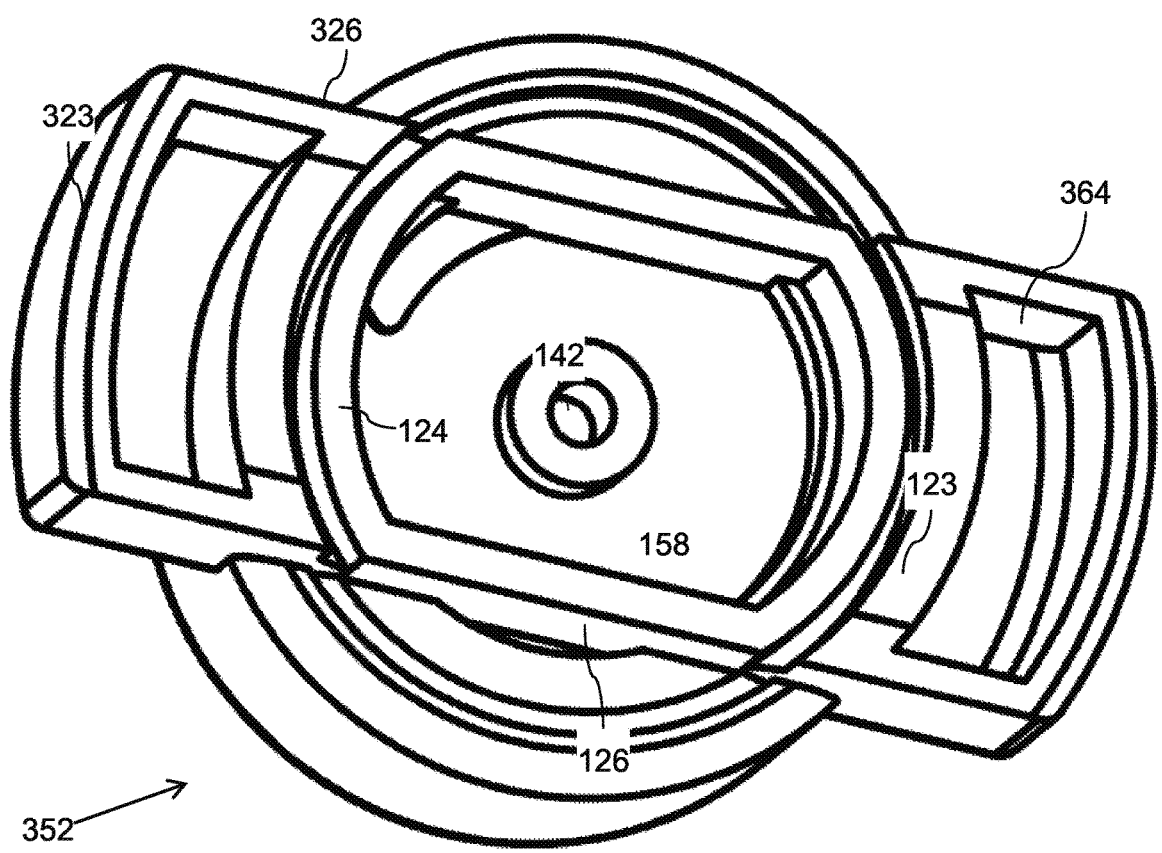
FIG. 3B is a perspective view, illustrating an outlet side of an alternative dripper in accordance with an embodiment of the present invention.

FIG. 3B is a view of the adapter outlet 125 side of an assembled dripper with the alternative embodiment of cover 352. FIG. 3B illustrates an exemplary connection between the body of the emitter and cover 352.

Axial Cross Section of an Emitter in a Conduit

FIG. 3C illustrates a large scale view of an axial-cross section of an emitter including cover 352 bonded to a conduit.

Close Up Axial Cross Section

An exemplary length 316 of the bonding zone and length 318 of the outlet zone are illustrated by dimension lines. It can be seen that wings 364 may optionally extend the length 316 of the bonding zone.

Bonding of a Coupler

Figure 4A:
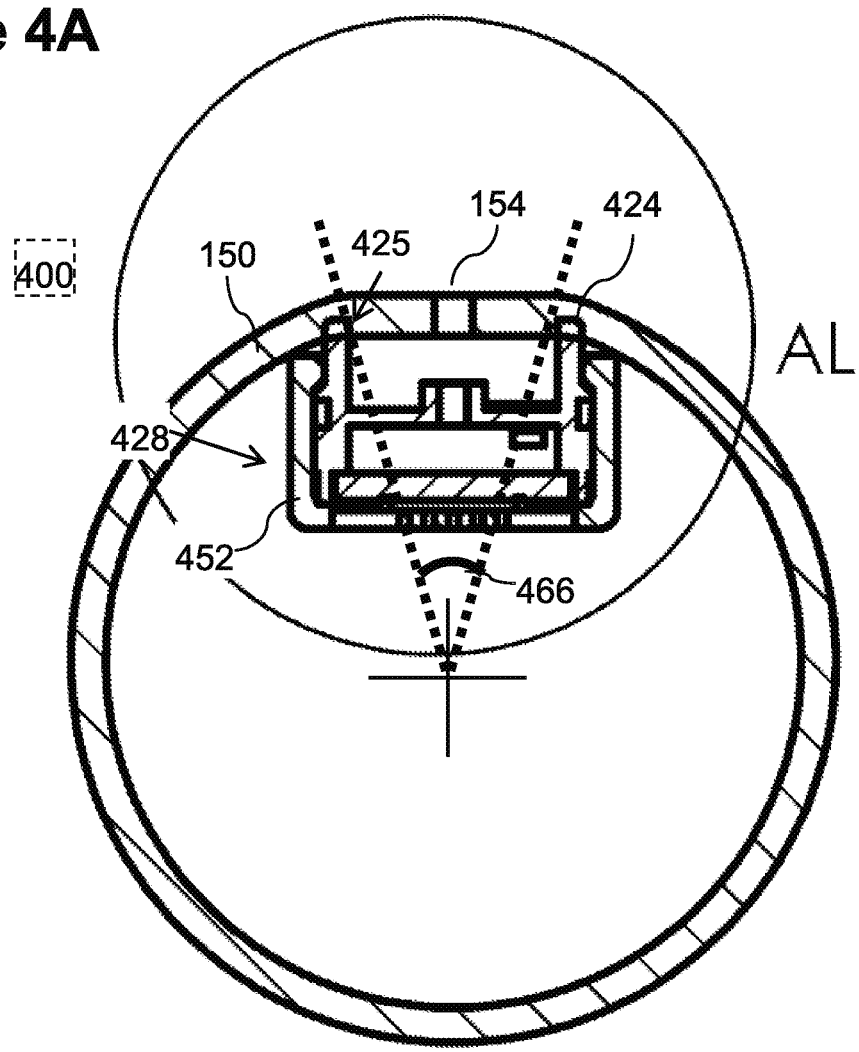
FIG. 4A is a trans-axial cross section of a conduit, illustrating an example of an installed drip emitter in accordance with an embodiment of the present invention.

FIG. 4A illustrates bonding of exemplary embodiment 400 of an emitter including a button shaped flow restrictor 428 connected to an inner surface of a conduit wall 150 by a coupler 425.

A closed perimeter bonding surface, rim 424 surrounds an outlet zone on wall 150 including an opening 154 that acts as a fluid outlet. In exemplary embodiment 400 bonding surface, rim 424 is optionally flat. FIG. 4A illustrates, that bonding a flat bonding surface, rim 424 to the conduit wall distorts the conduit. In some embodiments distortion may change the shape of the conduit, for example the diameter, less than 5%. The outlet perforation zone may occupy an angular extent 466 ranging for example between 20° to 90° or less of the circumference of the conduit. In some embodiments a cover 452 of the emitter may be bonded to conduit wall 150. Alternatively or additionally, cover 452 may not be bonded to conduit wall 150.

An Exemplary Flat Surface Emitter

Figure 4B:
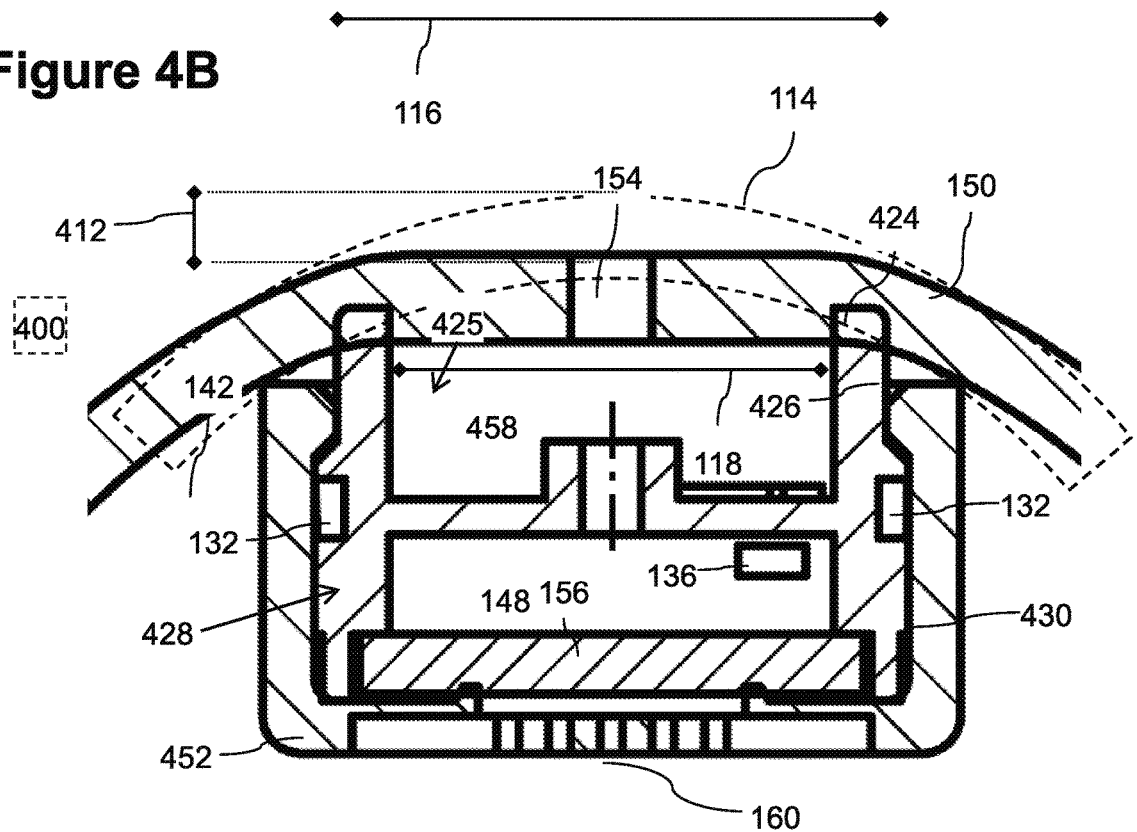
FIG. 4B is a large scale trans-axial cross section of a conduit, illustrating an example of an installed drip emitter in accordance with an embodiment of the present invention.

FIG. 4B is a trans-axial cross section of an emitter bonded to an inner wall of a conduit. FIG. 4B illustrates an optional geometry for the bonding zone and outlet zone of the emitter. FIG. 4B illustrates an exemplary relationship between the emitter, the coupler and the bonding zone and the outlet zone.

In FIG. 4B, closed perimeter bonding surface, rim 424 is bonded to an inner surface of a conduit wall 150. Wall 150 is optionally displaced by a maximum distortion 412 from its unstressed form 414 (represented in FIG. 4B by the dotted curve). Optionally the change in the outer diameter of the conduit (defined for example as the maximum distortion 412 divided by the unstressed diameter) is less than 5%.

The area where surface, rim 424 of coupler 425 is bonded to conduit wall 150 is called the bonding zone. In FIG. 4B, for example, bonding zone is round and has a width 116 trans-axial to the conduit. The area circumscribed by closed inner perimeter of surface, rim 424 is the outlet zone. For example, in FIG. 4B, the outlet zone is round and has a width 118. In the outlet zone, wall 150 is perforated to form an outlet opening 154.

The exemplary embodiment of FIG. 4B includes a cylindrical element flow restrictor 428, which includes for example a cover 452 surrounding a cylindrical surface 130 (alternately or additionally, a cylindrical surface 130 may be a truncated cone). The fluid from inside the conduit may flow along a fluid path that includes for example entering an inlet 160 and/or flowing through a channel inlet into a tortuous channel 132 which may wind around surface 130 to a channel outlet 136 and/or a regulator cavity 148. Regulatory cavity 148 may be closed on one side by a membrane 156 and/or lead on the other side through a regulator outlet 142 to an outlet chamber 458 of coupler 425. Closed perimeter bounding surface, rim 424 forms the edge of outlet chamber 458. The perimeter of closed perimeter bounding surface demarks an outlet zone the wall 150 of the conduit. The outlet zone is optionally large enough to be perforated by automatic means known in the art to produce a fluid outlet in the conduit. The emitter may optionally include one or more orientation elements 426 which may facilitate orientating the emitter, for example as explained herein below.

Alternatively or additionally, the flat bonding surface, rim 424 coupler 425 of embodiment 400 may be combined with any of the previous embodiments 100, 200, 300. Alternatively or additionally, a flat bonding surface, rim 424 coupler 425 may be combined with a cover having a bonding surface and/or wings, for example as described in any of the previous embodiments 100, 200, 300.

Orientation of a Flat Coupler

Figure 4C:
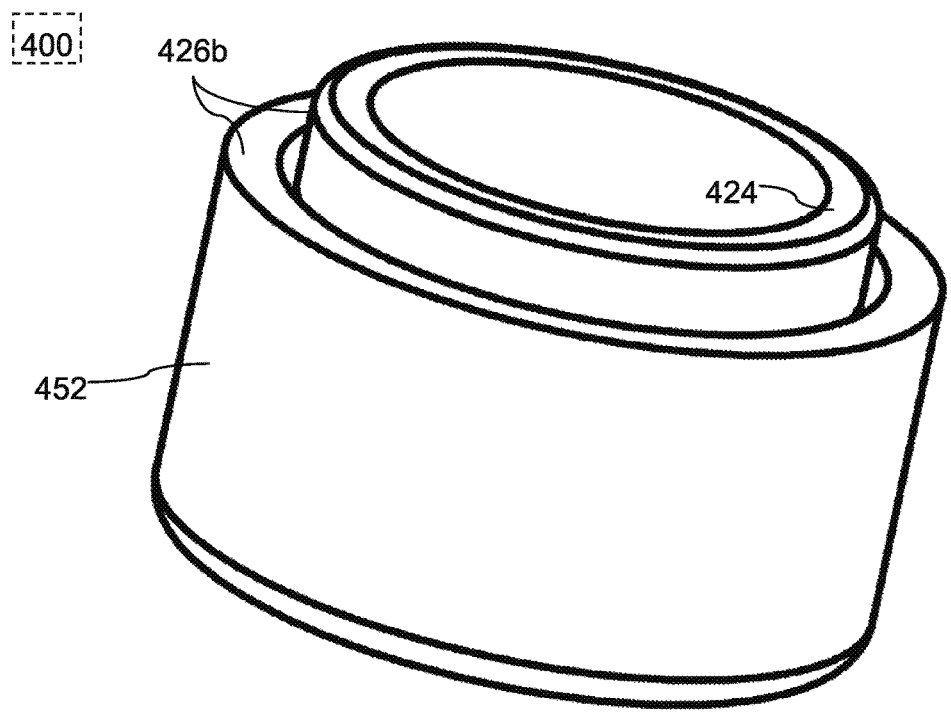
FIG. 4C is a perspective view, illustrating a coupler installed into a cover in accordance with an embodiment of the present invention.

FIG. 4C illustrates exemplary embodiment 400 assembled with cover 452. Optionally, a portion of cylindrical surface 430 protruding from cover 452 may serve as a coupler 425 and/or as an orientation element 426 to orient surface, rim 424 towards to wall of the conduit. Alternatively or additionally an edge of cover 452 and or the step formed between the edge of cover 452 and the protruding cylindrical surface 430 may serve as an orientation element 426. In exemplary embodiment 400, the closed perimeter of surface, rim 424 is circular and optionally does not require orientation with respect to the axis of the conduit.

A Flat Surfaced Coupler Body

Figure 4D:
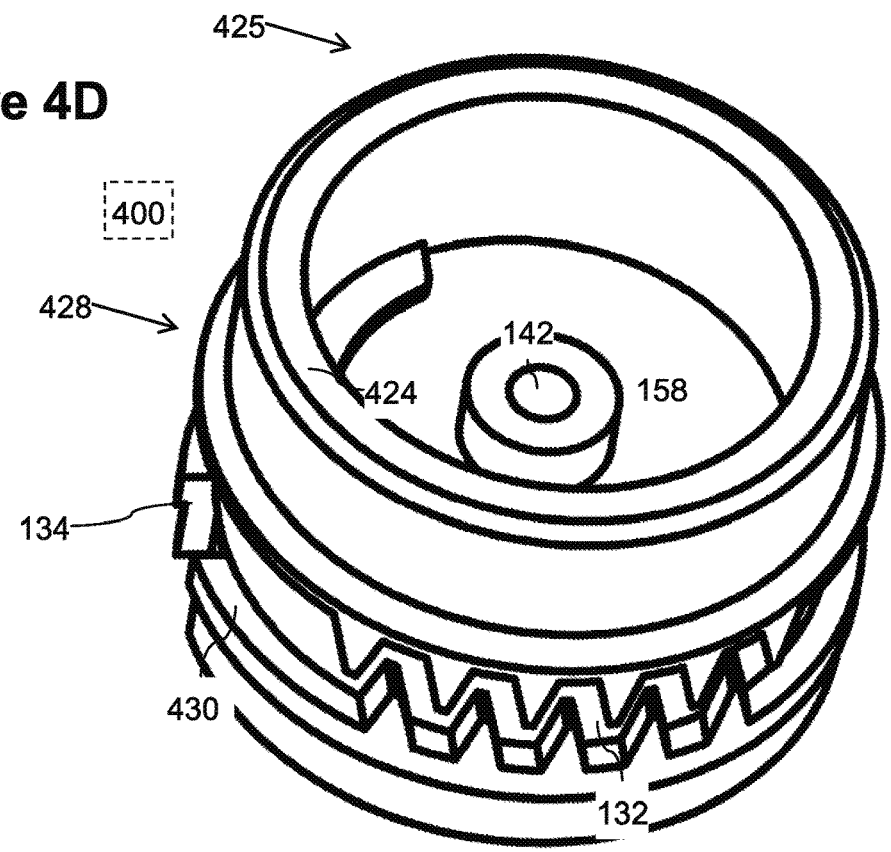
FIG. 4D is a perspective view, illustrating an exemplary drip emitter body in accordance with an embodiment of the present invention.

FIG. 4D illustrates exemplary embodiment 400 emitter body including coupler 425 for connecting flow restrictor 428 to an inner wall of a conduit. Coupler 425 has a flat closed perimeter bonding surface, rim 424 which circumscribes an outlet zone large enough for automated perforation and/or small enough to avoid too much distortion of the wall of the conduit.

For example the width and/or diameter of the outlet zone may be close to (±20%) the diameter of flow restrictor 428. For example the diameter of the outlet zone may range between 4 and 10 mm. For example the width of the outlet zone may range between 50% and 100% of the diameter of flow restrictor 428. Alternatively or additionally the width of the outlet zone may range, for example, between 100% and 150% of the diameter of flow restrictor 428. Alternatively or additionally, the size of the outlet zone may differ from that of the flow restrictor. The outlet zone may optionally be between 4 and 10 mm in length and/or width. The outlet zone may optionally be elongated, for example along the axis of the conduit. The bonding surface may include protrusions and/or ridges and/or steps. For example, ridges may increase the boding surface are area.

It is expected that during the life of a patent maturing from this application many relevant technologies will be developed and the scope of the terms are intended to include all such new technologies a priori.

As used herein the term "about" refers to ±5%.

The terms "comprises", "comprising", "includes", "including", "having" and their conjugates mean "including but not limited to".

The term "consisting of" means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A cylindrical drip emitter for bonding to an inner surface of a conduit having a general fluid flow direction, comprising:
    a cover including,
        a cylindrical cavity having an open end, and
        a fluid inlet providing fluid communication between an outer surface of said cover and an inner surface of said cylindrical cavity; and
    a body including,
        a cylindrical portion having a main axis, and a regulator chamber, and
        an outlet chamber extending along said main axis, from an end of said cylindrical portion in fluid communication with said regulator chamber; said outlet chamber having an aperture facing away from said cylindrical portion and bounded by a rim;
    wherein, said cylindrical portion is shaped and sized for insertion into said cylindrical cavity to form a labyrinth flow path by at least one baffle protruding inward from said inner surface of said cylindrical cavity, at least one baffle protruding outward from an outer surface of said cylindrical portion of said body, and one or more of the at least one baffle protruding outward from said outer surface of said cylindrical cavity protrudes in a direction which is in said general fluid flow direction of the conduit after said bonding;
    wherein, said labyrinth flow path connects said fluid inlet of the cover to said regulator chamber when said cylindrical portion is inserted into said cylindrical cavity; and
    wherein, said rim is exposed through said open end of said cylindrical cavity for bonding to said inner surface of said conduit.

2. The drip emitter of claim 1, wherein said aperture of said outlet chamber has a width of between 2 mm and 10 mm.

3. A drip irrigation system comprising a plurality of drip emitters according to claim 1 attached to an inner surface of an irrigation tube, said tube including a plurality of openings, each said plurality of openings surrounded by a rim of an outlet chamber of a respective emitter of said plurality of drip emitters.

4. The drip emitter of claim 1, wherein said cover and body form a self contained button flow restrictor.

5. The drip emitter of claim 1, wherein said regulator chamber includes a first opening and a second opening, said first opening positioned for fluid communication with said labyrinth flow path when said cylindrical portion is inserted into said cylindrical cavity and said second opening positioned to be exposed to fluid pressure from said fluid inlet when said cylindrical portion is inserted into said cylindrical cavity.

6. The drip emitter of claim 5, wherein said regulator chamber further includes a regulator labyrinth channel in a surface opposite said second opening, said regulator labyrinth flow channel connecting said labyrinth flow channel to said outlet chamber when said cylindrical portion of said body is inserted into said cylindrical cavity of said cover.

7. The drip emitter of claim 5, further including a flexible membrane, said flexible membrane sized and shaped to fit between said fluid inlet and said second opening of said regulator chamber blocking flow from said fluid inlet through said second opening when said cylindrical portion is inserted to said cylindrical cavity.

8. The drip emitter of claim 1, wherein substantially all flow from said fluid inlet to said regulator chamber passes through said labyrinth flow path when said cylindrical portion is inserted into said cylindrical cavity.

9. The drip emitter of claim 1, wherein said labyrinth flow path reduces a fluid pressure of fluid entering said regulator chamber with respect to a fluid pressure at said fluid inlet.

10. The drip emitter of claim 6, further including a channel in said outer surface of said cylindrical portion of said body surface of said cylindrical portion of said body, said channel in communication with said first opening, said channel forming at least a part of said labyrinth flow path when said cylindrical portion of said body is inserted into said cylindrical cavity.

11. The drip emitter of claim 1 wherein said rim has an arched profile which lies on a cylindrical surface having an axis substantially perpendicular to said main axis of said cylindrical portion.

12. The drip emitter of claim 11, wherein a curvature of the arched profile matches a curvature of the inner surface of the conduit.

13. The drip emitter of claim 1, wherein said cover further includes:
    a bonding surface having an arched profile, which lies on a cylindrical surface having a bonding surface axis substantially perpendicular to said main axis of said cylindrical portion, sized and shaped for bonding said cover to the inner surface of the conduit.

14. The drip emitter of claim 1, wherein said aperture of said outlet chamber has a width between 50% to 100% of a diameter of said cylindrical portion.

15. The drip emitter of claim 1, wherein said body is a molded element and said cover is a molded element and said body and said cover are molded separately.

16. The drip emitter of claim 1, wherein said rim protrudes from said open end of said cylindrical cavity.

17. The drip emitter of claim 16, wherein said protruding rim serves to determine an alignment of said drip emitter with respect to said inner surface of said conduit.

18. The drip emitter of claim 1, wherein said labyrinth flow path winds along said outer surface of said cylindrical portion of said body.

19. The drip emitter of claim 1, wherein said rim has a closed perimeter.

20. The drip emitter of claim 1, wherein said outer surface of said cylindrical portion of said body is an outside surface of said body.

21. The drip emitter of claim 1, wherein said at least one baffle protruding inward from said inner surface of said cylindrical cavity and said at least one baffle protruding outward from said outer surface of said cylindrical portion extend in a direction of said main axis in a height shorter than the radius of said conduit.

22. The drip emitter of claim 1, wherein said outlet chamber comprises one or more flat side surfaces.

23. The drip emitter of claim 13, wherein said cover further comprises:
an orientation element having one or more side surfaces aligned with said bonding surface axis, sized and shaped for aligning said bonding surface with said substantially cylindrical surface.

* * * * *